US012766712B2

(12) United States Patent
Wicks et al.

(10) Patent No.: US 12,766,712 B2
(45) **Date of Patent: *Oct. 20, 2026**

(54) MACHINE LEARNING BASED DECISION MAKING FOR ROBOTIC ITEM HANDLING

(71) Applicant: Intelligrated Headquarters, LLC, Mason, OH (US)

(72) Inventors: Matthew R. Wicks, Saint Charles, MO (US); Dikshya Swain, St. Louis, MO (US); Abhijit Makhal, St. Louis, MO (US); Dominic G. Clucas, Saint Peters, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/784,401

(22) Filed: Jul. 25, 2024

(65) Prior Publication Data

US 2024/0408750 A1 Dec. 12, 2024

Related U.S. Application Data

(63) Continuation of application No. 17/019,546, filed on Sep. 14, 2020, now Pat. No. 12,070,860.

(51) Int. Cl.
*B25J 9/00* (2006.01)
*B25J 9/16* (2006.01)
(Continued)

(52) U.S. Cl.
CPC ............. *B25J 9/163* (2013.01); *B25J 9/0093* (2013.01); *B25J 9/1697* (2013.01); *B25J 15/0616* (2013.01); *G05B 13/027* (2013.01)

(58) Field of Classification Search
CPC ........ B25J 9/163; B25J 9/0093; B25J 9/1697; B25J 15/0616; B25J 5/007; B25J 19/021;
(Continued)

(56) References Cited

U.S. PATENT DOCUMENTS 8,452,448 B2 5/2013 Pack et al.
9,493,316 B2 11/2016 Girtman et al.
(Continued)

FOREIGN PATENT DOCUMENTS

CN 106573381 A 4/2017
CN 111461107 A 7/2020

OTHER PUBLICATIONS

F. Islam, A. Vemula, S.-K. Kim, A. Dornbush, O. Salzman and M. Likhachev, "Planning, Learning and Reasoning Framework for Robot Truck Unloading," 2020 IEEE International Conference on Robotics and Automation (ICRA), Paris, France, 2020, pp. 5011-5017, doi: 10.1109/ICRA40945.2020.9196604. (Year: 2020).*

(Continued)

*Primary Examiner* — Khoi H Tran
*Assistant Examiner* — Tien Minh Le
(74) *Attorney, Agent, or Firm* — Alston & Bird LLP

(57) ABSTRACT

A method for controlling a robotic item handler is described. The method includes constructing a machine learning model based on a combined point cloud data as an input to a convolution neural network, outputting a decision classification indicative of a first probability associated with a first operating mode and a second probability associated with a second operating mode, selecting one of the first operating mode and the second operating mode of the robotic item handler based on the decision classification outputted by the machine learning model, and operating the robotic item handler according to the selection of the one of the first operating mode and the second operating mode.

20 Claims, 11 Drawing Sheets

(51) Int. Cl.
*B25J 15/06* (2006.01)
*G05B 13/02* (2006.01)

(58) Field of Classification Search
CPC .................. B25J 9/161; G05B 13/027; G05B 2219/39271; G05B 2219/40006; G05B 2219/40039; G05B 2219/40298
See application file for complete search history.

(56) References Cited

U.S. PATENT DOCUMENTS

| | | | | |
|---|---|---|---|---|
| 9,969,573 | B2 | 5/2018 | Girtman et al. | |
| 2015/0352721 | A1* | 12/2015 | Wicks | B25J 9/1664 700/228 |
| 2018/0362270 | A1 | 12/2018 | Clucas et al. | |
| 2020/0094997 | A1 | 3/2020 | Menon et al. | |
| 2020/0095001 | A1 | 3/2020 | Menon et al. | |
| 2020/0164517 | A1 | 5/2020 | Dick et al. | |
| 2020/0234071 | A1 | 7/2020 | Yuvaraj et al. | |
| 2020/0361083 | A1* | 11/2020 | Mousavian | G06N 3/063 |

OTHER PUBLICATIONS

CN Office Action Mailed on Feb. 8, 2025 for CN Application No. 202111073091, 8 page(s).
English Translation of CN Office Action dated Feb. 8, 2025 for CN Application No. 202111073091, 13 page(s).
Final Rejection Mailed on Mar. 7, 2024 for U.S. Appl. No. 17/019,546, 43 page(s).
Islam, "Planning, Learning and Reasoning Framework for Robot Truck Unloading," arXiv, 7 pgs., (Jun. 18, 2020).
CN Notice of Allowance Mailed on Oct. 27, 2025 for CN Application No. 202111073091, 2 page(s).
English translation of CN Notice of Allowance dated Oct. 27, 2025 for CN Application No. 202111073091, 2 page(s).
Communication about intention to grant a European patent Mailed on Oct. 6, 2025 for EP Application No. 21195844, 6 page(s).
CN Office Action Mailed on Aug. 16, 2025 for CN Application No. 202111073091, 6 page(s).
English Translation of CN Office Action dated Aug. 16, 2025 for CN Application No. 202111073091, 9 page(s).
Advisory Action (PTOL-303) Mailed on Aug. 8, 2023 for U.S. Appl. No. 17/019,546, 3 page(s).
EP Office Action Mailed on May 9, 2023 for EP Application No. 21195844, 12 page(s).
European Search Report Mailed on Jan. 31, 2022for EP Application No. 21195844.2, 11 page(s).
Examiner Interview Summary Record (PTOL-413) Mailed on Apr. 24, 2023 for U.S. Appl. No. 17/019,546, 2 page(s).
F. Islam, A. Vemula, S.-K. Kim, A. Dornbush, O. Salzman and M. Likhachev, "Planning, Learning and Reasoning Framework for Robot Truck Unloading," 2020 IEEE International Conference on Robotics and Automation (ICRA), 2020, pp. 5011-5017, doi: 10.1109/ICRA40945.2020.9196604. (Year: 2020).
Final Rejection Mailed on Jun. 21, 2023 for U.S. Appl. No. 17/019,546, 46 page(s).
Islam, et al, "Planning, Learning and Reasoning Framework for Robot Truck Unloading," (2019) 13 pages.
Non-Final Rejection Mailed on Dec. 21, 2022 for U.S. Appl. No. 17/019,546.
Non-Final Rejection Mailed on Sep. 27, 2023 for U.S. Appl. No. 17/019,546, 41 page(s).
Notice of Allowance and Fees Due (PTOL-85) Mailed on May 1, 2024 for U.S. Appl. No. 17/019,546, 6 page(s).
Office Action Appendix Mailed on Apr. 24, 2023 for U.S. Appl. No. 17/019,546, 2 page(s).
U.S. Provisional Application filed Mar. 31, 2014 for U.S. Appl. No. 61/973,188.
U.S. Provisional Application filed Oct. 23, 2013 for U.S. Appl. No. 61/894,889.
Extended European Search Report Mailed on Apr. 8, 2026 for EP Application No. 26152468, 13 page(s).
Zeng et al., "Robotic pick-and-place of novel objects in clutter with multi-affordance grasping and cross-domain image matching", The International Journal of Robotics Research, vol. 41, No. 7, Aug. 2, 2022, pp. 690-705.
Decision to grant a European patent Mailed on Jan. 29, 2026 for EP Application No. 21195844, 2 page(s).

* cited by examiner

MACHINE LEARNING BASED DECISION MAKING FOR ROBOTIC ITEM HANDLING

CROSS-REFERENCE TO RELATED APPLICATIONS

This Application claims the benefit of and priority to U.S. patent application Ser. No. 17/019,546, filed Sep. 14, 2020, which is hereby incorporated by reference in its entirety.

TECHNOLOGICAL FIELD

Example embodiments described herein relate generally to systems, methods, and apparatuses for performing machine learning based decision making for robotic item handling, and, more particularly, to performing machine learning based decision making for robotic item loading and/or unloading.

BACKGROUND

Generally, in material handling sites like, but not limited to, distribution centers, warehouses, inventories, or shipping centers, various machines such as, conveyors, palletizers, robotic arms, truck loaders/unloaders, and/or conveyor overhead units are used for performing various operations. For instance, vehicles (e.g. trucks, trailers etc.) loaded with goods e.g. cargo, products, shipments, and/or the like are used to deliver products to these material handling sites. To achieve lower overhead costs at retail stores, now-a-days, in-store product counts at distribution centers have been reduced and products-in-transit on vehicles like, trucks, trailers etc. are also counted as part of available store stock of an inventory. Typically, in the material handling environments, vehicles can be loaded/unloaded using manual labor if the containers are separate articles or can be loaded/unloaded using forklifts if the containers are palletized, or often by using other truck loader/unloader units. Using human laborers to load or unload and load large vehicle shipments can be physically difficult and can be costly due to the time and labor involved. Accordingly, automated loading/unloading of such vehicles quickly at a shipment loading/unloading dock of the material handling sites has attained new prominence as a way to refill depleted stock. Consequently, a significant need exists for an improved loading/unloading system that can load/unload bulk quantities of stacked cases and cargo from these vehicles more quickly and effectively, than human laborers and at a reduced cost.

SUMMARY

Various example embodiments described herein relate to a method for controlling a robotic item handler. The method can include obtaining first point cloud data related to a first three-dimensional image captured by a first sensor device of the robotic item handler. Further, the method can include obtaining second point cloud data related to a second three-dimensional image captured by a second sensor device of the robotic item handler. Further, the method can include transforming the first point cloud data and the second point cloud data to generate combined point cloud data. The method further can include constructing a machine learning model based on the combined point cloud data. In this regard, the combined point cloud data can be provided as an input to a convolutional neural network. Furthermore, the method can include outputting, by the machine learning model, a decision classification indicative of a first probability associated with a first operating mode and a second probability associated with a second operating mode. Furthermore, the method can include, operating the robotic item handler according to the first operating mode, in response to, the first probability being higher than the second probability and operating the robotic item handler according to the second operating mode, in response to, the second probability being higher than the first probability.

In some example embodiments, the first sensor device can be coupled to a robotic arm of the robotic item handler and the second sensor device can be coupled to a platform of the robotic item handler.

According to some example embodiments, the robotic item handler can be a robotic carton unloader that can be configured to perform at least one of: loading and unloading of items.

In some example embodiments, the first operating mode can be associated with picking an item by grasping the item using an end effector of a robotic arm of the robotic item handler. Further, the second operating mode can be associated with sweeping a pile of items from an item docking station with a platform of the robotic item handler.

According to some example embodiments, the method can further include evaluating a selection of the operating mode of the robotic item handler based on the decision classification outputted by the machine learning model and a pre-defined heuristic associated with past operations of the robotic item handler. Further, the method can include controlling the robotic item handler based on the operating mode selected upon the evaluation.

According to some example embodiments, the method can include adjusting a first weight associated with the decision classification and a second weight associated with the pre-defined heuristic, used for the evaluation of the selection, based on a performance associated with the output of the machine learning model over a period of time.

Some example embodiments described herein relates to a robotic item unloader. The robotic item unloader can include a vision system, a platform, a robotic arm, and a processing unit. The processing unit can be communicatively coupled to the vision system, the platform, and the robotic arm, respectively. The vision system can include a first sensor device and a second sensor device. The first sensor device can be positioned at a first location on the robotic item unloader and the second sensor device can be positioned at a second location on the robotic item unloader. Further, the platform of the robotic item unloader can include a conveyor. The platform can be configured to operate in a first operating mode. Furthermore, the robotic arm of the robotic item unloader can include an end effector that can be configured to operate in a second operating mode. In accordance with said example embodiments, the processing unit can be configured to obtain first point cloud data related to a first three-dimensional image captured by the first sensor device. Furthermore, the processing unit can be configured to obtain second point cloud data related to a second three-dimensional image captured by the second sensor device. Furthermore, the processing unit can be configured to transform the first point cloud data and the second point cloud data to generate a combined point cloud data. Furthermore, the combined point cloud data can be used as an input to a convolutional neural network to construct a machine learning model. Furthermore, the processing unit can be configured to output, by the machine learning model, a decision classification. The decision classification can be indicative of a probability distribution associated with a first probability and a second probability. In this regard, the first probability can be associated with selection of the first operating mode and the second probability can be associated with selection of the second operating mode. Furthermore, the processing unit can be configured to control the robotic item unloader based on the first operating mode or the second operating mode.

In accordance with said example embodiments, the processing unit can be configured to control the robotic item unloader by operating the platform of the robotic item unloader according to the first operating mode in response to the first probability being higher than the second probability. Furthermore, the processing unit can be configured to control the robotic item unloader by operating the robotic arm of the robotic item unloader according to the second operating mode in response to the second probability being higher than the first probability.

According to some example embodiments described herein, in the first operating mode, a section of the platform of the robotic item unloader can be configured to sweep a pile of items, thereby, guiding one or more items of the pile of items onto the conveyor. Further, in some example embodiments, in the second operating mode, a section of the robotic arm of the robotic item unloader can be configured to pick an item by grasping a portion of the item using the end effector of the robotic arm.

According to some example embodiments, the processing unit of the robotic item unloader can be configured to evaluate a selection of the first operating mode and the second operating mode, based on the first probability and the second probability outputted by the machine learning model and a pre-defined heuristic associated with past operations of the robotic item unloader. Further, the processing unit can be configured to control the robotic item unloader based on the evaluation of the selection.

According to some example embodiments, the first sensor device and the second sensor device can include at least one depth camera and a color camera. Further, the first sensor device can be coupled to the robotic arm of the robotic item unloader and the second sensor device can be coupled to the platform of the robotic item unloader.

In accordance with some example embodiments to perform at least one of: loading and unloading of a plurality of items from an item docking station, the processing unit of the robotic item unloader can be configured to: generate a first command to operate the robotic arm according to the first operating mode and generate a second command to operate the platform according to the second operating mode.

In accordance with some example embodiments, the processing unit of the robotic item unloader can be configured to further adjust a first weight associated with the decision classification and a second weight associated with the pre-defined heuristic, used for the evaluation of the selection, based on a performance associated with the output of the machine learning model over a period of time.

Some example embodiments described herein relates to a non-transitory computer readable medium that stores thereon computer-executable instructions that in response to execution by a processor, perform operations. The operations can include obtaining first point cloud data related to a first three-dimensional image captured by a first sensor device of a robotic item handler. Further, the operations can include obtaining second point cloud data related to a second three-dimensional image captured by a second sensor device of the robotic item handler. Furthermore, the operations can include transforming the first point cloud data and the second point cloud data to generate a combined point cloud data. Furthermore, the operations can include constructing a machine learning model by using the combined point cloud data as an input to a convolution neural network. The operations can further include, outputting, by the machine learning model, a decision classification indicative of a probability associated with an operating mode of the robotic item handler. Furthermore, the operations can include generating a first command to operate the robotic item handler based on the decision classification.

According to some example embodiments, the non-transitory computer readable medium can further store thereon computer-executable instructions that in response to execution by the processor, perform operations that can include evaluating a selection of the operating mode of the robotic item handler based on the decision classification and a pre-defined heuristic associated with past operations of the robotic item handler. Further, the operations can include generating a second command to operate the robotic item handler based on the evaluation of the selection.

BRIEF DESCRIPTION OF THE DRAWINGS

The accompanying drawings illustrate embodiments of the invention, and, together with the specification, including the general description above and the detailed description which follows, serve to explain the features of the present invention.

DETAILED DESCRIPTION

Figure 1:
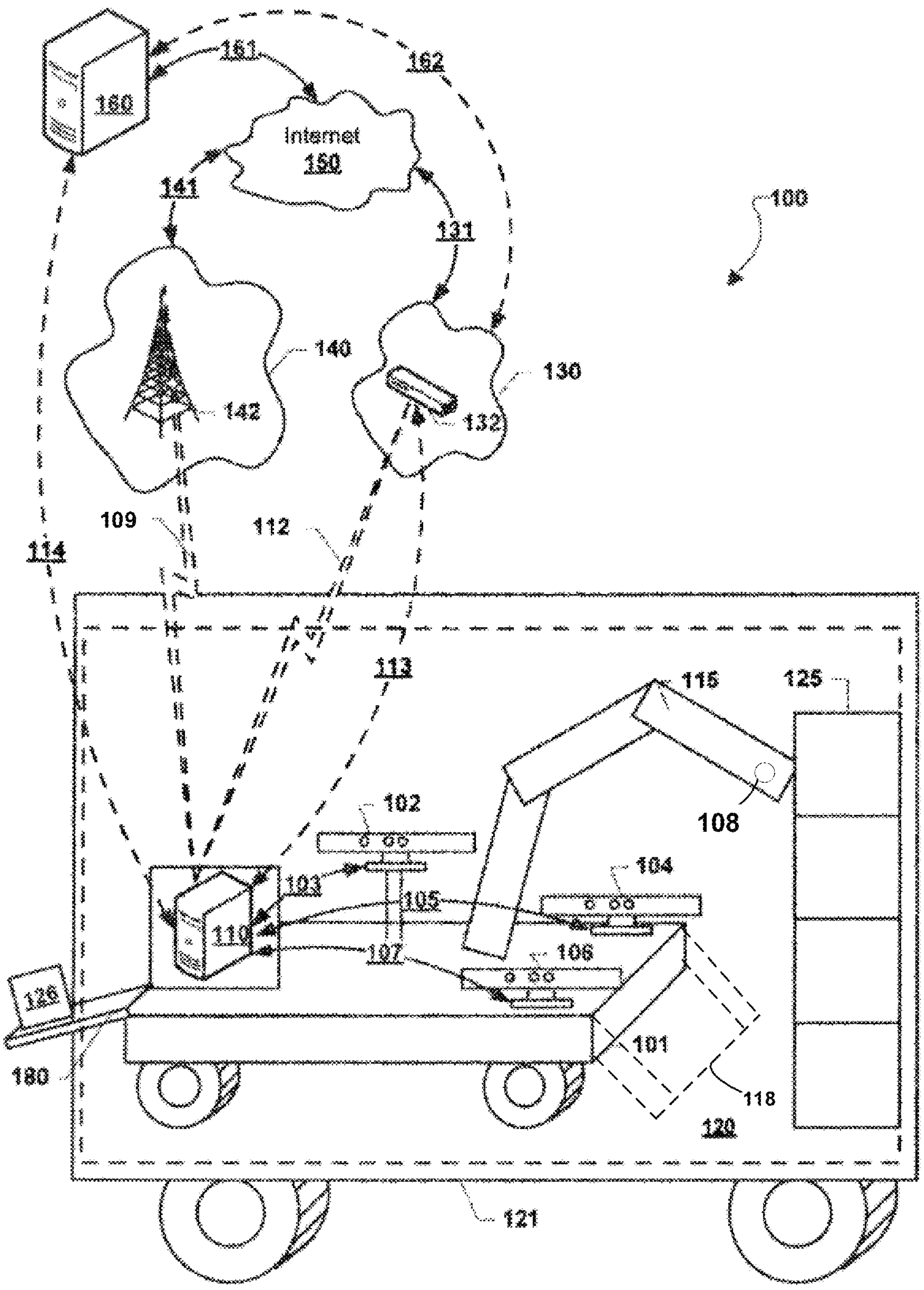
FIG. 1 illustrates a schematic view of a system including a robotic item handler according to an example embodiment.

The present invention now will be described more fully hereinafter with reference to the accompanying drawings in which some but not all embodiments of the inventions are shown. Indeed, these inventions can be embodied in many different forms and should not be construed as limited to the embodiments set forth herein; rather, these embodiments are provided so that this disclosure will satisfy applicable legal requirements. Like numbers refer to like elements throughout. As used herein, terms such as “front,” “rear,” “top,” “outside,” “inside,” etc. are used for explanatory purposes in the examples provided below to describe the relative position of certain devices or portions of devices. Terminology used in this patent is not meant to be limiting insofar as devices described herein, or portions thereof, can be attached or utilized in other orientations.

The term “comprising” means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases “in one embodiment,” “according to one embodiment,” and the like generally mean that the particular feature, structure, or characteristic following the phrase can be included in at least one embodiment of the present invention, and can be included in more than one embodiment of the present invention (importantly, such phrases do not necessarily refer to the same embodiment).

The word “exemplary” is used herein to mean “serving as an example, instance, or illustration.” Any implementation described herein as “exemplary” is not necessarily to be construed as preferred or advantageous over other implementations.

The terms “about” or “approximately” or the like, when used with a number, can mean that specific number, or alternatively, a range in proximity to the specific number, as understood by persons of skill in the art field.

If the specification states a component or feature “can,” “can,” “could,” “should,” “would,” “preferably,” “possibly,” “typically,” “optionally,” “for example,” “often,” or “might” (or other such language) be included or have a characteristic, that particular component or feature is not required to be included or to have the characteristic. Such component or feature can be optionally included in some embodiments, or it can be excluded.

As used herein, the term “transmitter” refers to any component that can generate radio waves for communication purposes while a “receiver” is used to generally refer to any component that can receive radio waves and convert the information into useable form. A “transceiver” generally refers to a component that can both generate radio waves and receive radio waves and is thus contemplated when either a transmitter or a receiver is discussed.

The term “processor” is used herein to refer to any programmable microprocessor, microcomputer or multiple processor chip or chips that can be configured by software instructions (applications) to perform a variety of functions, including the functions of the various embodiments described above. In some devices, multiple processors can be provided, such as one processor dedicated to wireless communication functions and one processor dedicated to running other applications. Software applications can be stored in the internal memory before they are accessed and loaded into the processors. The processors can include internal memory sufficient to store the application software instructions. In many devices the internal memory can be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to “memory” refers to memory accessible by the processors including internal memory or removable memory plugged into the device and memory within the processors themselves. For instance, memory can be any non-transitory computer readable medium having computer readable instructions (e.g., computer program instructions) stored thereof that are executable by a processor.

The term “electronic device” used hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The various embodiments are described herein using the term “computing platform” or “master device” or “server” or “supervisor device” used interchangeably for the purpose of brevity. The term “server” can be used herein to refer to any computing device or a distributed network of computing device capable of functioning as a server, such as a master exchange server, web server, mail server, document server, or any other type of server. A server can be a dedicated computing device or a computing device including a server module (e.g., running an application which can cause the computing device to operate as a server). A server module (e.g., server application) can be a full function server module, or a light or secondary server module (e.g., light or secondary server application) that is configured to provide synchronization services among the dynamic databases on computing devices. A light server or secondary server can be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the server can correspond to any of, an industrial computer, a cloud computing-based platform, an external computer, a standalone computing device, and/or the like. In some example embodiments, the master device or the computing platform can also refer to any of the electronic devices, as described herein. In some example embodiments, the server can include an access point or a gateway device that can be capable of communicating directly with one or more electronic devices and can also be capable of communicating (either directly or indirectly via a communication network such as the Internet) with a network establishment service (e.g. Internet service provider). In some example embodiments, the server can manage the deployment of one or more electronic devices throughout a physical environment. In some example embodiments, the server can refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

In some example embodiments, the term "server" can be used herein to refer to any one of or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, tablets, headsets, and smartwatches are generally collectively referred to as mobile devices.

The components illustrated in the figures represent components that may or may not be present in various embodiments of the invention described herein such that embodiments can include fewer or more components than those shown in the figures while not departing from the scope of the invention.

Typically, in a material handling environment, items such as, cartons, goods, shipments, packages, containers, and/or the like are handled to be positioned from one place to another. For instance, in some examples, these items are to be unloaded from a transport vehicle onto a conveyor of the material handling environment. In another example, the items are to be loaded from the conveyor onto a carriage section of the transport vehicle. Manual loading/unloading of such items can be costly, less productive, and inefficient. In this regard, in some environments, robotic item handling devices (for example, robotic manipulators, robotic unloaders etc.) are used to reduce human efforts. Some examples of robotic item handlers include an end effector (e.g. a vacuum suction cup) that can pick one or more items by grasping the items. Further, some examples of robotic item handlers also include a platform that can be movably positioned from one position to another. These platforms are configured to move such that a section of the platform can sweep below some portions of items thereby pulling the items from the carriage section of the transport vehicle onto the platform. Accordingly, various other configurations of the robotic item handlers are used to load/unload items in the material handling environment.

In some example situations, a mode of operation (e.g., but not limited to, picking based on grasping or sweeping under the items) by these robotic item handlers also depends on a manner in which items are stacked (e.g. in an item docking station). For instance, in some situations, items can be organized/stacked as a pile. In other situations, items can be scattered over an area (e.g. on a floor of the item docking station or carriage section). Said that, for situations in which items are stacked over each other in a pile, the robotic item handler can be configured to operate in a mode so as to grab each item using the end effector of the robotic item handler. Alternatively, for situations in which items are scattered, the robotic item handler can be configured to operate in a mode so as to pull one or more items by sweeping a section of a platform of the robotic item handler below some portion of the items. Accordingly, the robotic item handler is to be configured to operate in different operating modes for effectively handling items according to various situations (predictable or unpredictable) which can arise depending on various arrangements in which items are organized or stacked (pile, wall, scattered, etc.)

Various example embodiments described herein relates machine learning based decision making for robotic item handling. According to some example embodiments, a machine learning (ML) model can be used to determine a suitable operating mode of a robotic item handler (e.g. a robotic carton unloader). In an example, the robotic item handler can include a first sensor device that can be positioned at a first location and a second sensor device that can be position at a second location on the robotic item handler. In this regard, the first sensor device can capture a first three-dimensional image (3D) of a portion (e.g. a first portion) of an environment in its field of view. Similarly, the second sensor device can capture a second 3D image of another portion (e.g. a second portion) of the environment according to its field of view. According to various example embodiments described herein, first point cloud data corresponding to the first 3D image and second point cloud data corresponding to the second 3D image can be obtained and transformed to generate a combined point cloud data. In an example, the combined point cloud data can be indicative of a 3D representation of an entire environment that can be in front of the robotic item handler. As an example, the combined point cloud data can represent a 3D view of an item docking station that may include items (e.g. cartons, packages etc.) in various orientation and arrangement, which are to be handled by the robotic item handler. In accordance with said example embodiments, the combined point cloud data can be used as an input to a convolutional neural network to construct the ML model. Further, the ML model can output a decision classification that can indicate a probability distribution function associated with selection of using an operating mode of the robotic item handler. As an example, the ML model can output a first probability of using a first operating mode (e.g. picking by grasping items) or a second operating mode (e.g. picking by sweeping items) of the robotic item handler. In this aspect, in an example, an operating mode with a higher probability can be selected and the robotic item handler can be operated according to that operating mode.

Further, in some example embodiments, a performance of the output of the ML model can be re-evaluated over a period of time. In this regard, instead of using the output of the ML model as a sole factor, a decision to select an operation mode of the robotic item handler can be based on several other factors including, but not limited to, predefined heuristics associated with past selection of the operating mode of the robotic item handler in various situations. In other words, according to some examples, the decision of select the operation mode of the robotic item handler can be based on evaluating the ML model's performance and computing a weighted average of the multiple factors including the output of the ML model. Further details of the machine learning based selection of the operating mode of robotic item handler are described in reference to description of FIGS. 1-11.

FIG. 1 illustrates an example of an item handling system 100 that includes an exemplary robotic item handler 101. In some examples, the robotic item handler 101 can be a robotic carton unloader that can be used loading and/or unloading one or more cartons in a material handling environment. As illustrated, the robotic item handler 101 can be configured with a plurality of sensor devices 102-108. According to some example embodiments, the robotic item handler 101 can be a mobile vehicle having a platform 118 (or frame) with wheels. The mobile vehicle type robotic item handler can be capable of moving through an area 120 (e.g. a carton unloading area, a cargo area, a shipment docking area etc.). In an example, the robotic item handler 101 can be designed for use within the trailer of a cargo truck 121. In some examples, the robotic item handler 101 can be capable of moving in a material handling site and further performing loading and/or unloading of items from a cargo truck 121, by movably positioning a section of the platform 118 of the robotic item handler 101 within the cargo truck 121.

Figure 5:
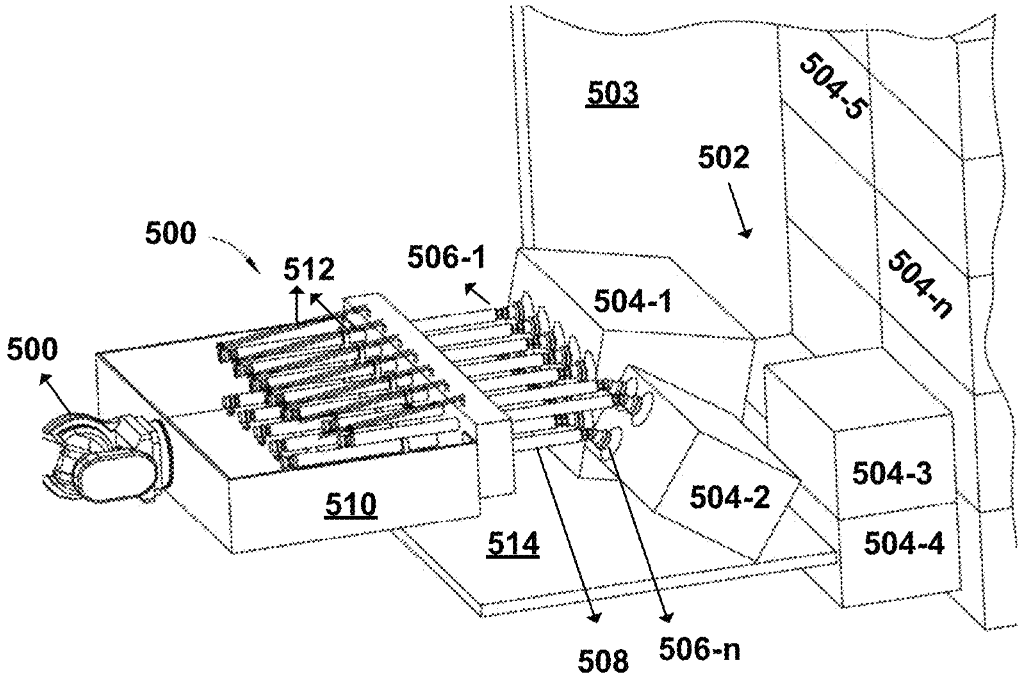
FIG. 5 illustrates a schematic view of a robotic arm of the robotic item handler in operation according to a first operating mode, according to an example embodiment.

According to some example embodiments described herein, the robotic item handler 101 can be equipped with various components that can be mounted-on or otherwise included within the robotic item handler 101. For instance, as illustrated, the robotic item handler 101 can include a robotic arm 115. In some examples, the robotic arm 115 can include an end effector that can be capable of removing one or more items (e.g., boxes) from a wall of items 125 and further placing removed items 126 on a conveyor 180. As an example, in some situations, the end effector of the robotic arm 115 can include an array of vacuum suction cups that can be selectively actuated to grasp a portion of the item to remove the item from the wall of item 125. FIG. 5 described later in the description illustrates such an example of the end effector. According to some example embodiments, as illustrated, the platform 118 of the robotic item handler can be coupled to the conveyor 180 that can be capable of conveying the removed items 126 away from the area 120.

Illustratively, the robotic item handler 101 can include the plurality of sensor devices 102-108. In some example embodiments, the plurality of sensor devices 102-108 can include, for example, but not limited to, a three-dimensional imaging system (e.g. a depth sensing camera, a color camera, a pattern projection unit etc.) that can perform various imaging operations e.g. capturing 3D images, performing forward scanning of an area based on pattern projection, recording video streaming of the environment. In this regard, the plurality of sensor devices 102-108 can be capable of capturing one or more 3D images of same or different portions of the environment that may fall in its respective field of views.

According to some example embodiments, one or more distance sensors (not shown) can be utilized by the robotic item handler 101 to guide the robotic item handler 101 into the area 120 (e.g., a semi-trailer). For instance, in some example embodiments, the robotic item handler 101 can utilize "curb feeler" distance sensors that use contact to measure distance from the walls of the area 120. Alternately, such distance sensors can use light, sound, or other methods to sense distance.

In some example embodiments, the robotic item handler 101 can also include a computing device (e.g., a personal computer, etc.) that can be used for commanding and controlling various operations of the robotic item handler 101. In some embodiments, the robotic item handler 101 can include an operator interface (not shown) or Human Machine Interface (HMI). In some examples, the HMI can be attached to the conveyor 180 and can also include input/output devices such as, a joystick, a display (e.g., a monitor), and/or a keypad (not shown). The robotic item handler 101 can further include an electronics box (not shown) that can contain electrical components of the control and vision systems of the robotic item handler 101. According to some example embodiments, the robotic item handler 101 can include some components such as, an internal structural frame, wheel drive motors, a vehicle controller, and an energy source (not shown), such as batteries or liquid petroleum (LP) gas to power the robotic item handler 101. Further details of such internal components of the robotic item handler 101 are described with reference to FIG. 3.

In accordance with some example embodiments, the robotic arm 115 can include an end effector that can be configured to utilize grasping mechanisms (e.g., claws, clamps, etc.), suction cup mechanisms, and/or lift mechanisms (e.g., ramps, shoveling implements, etc.) to remove items from the wall of items 125. For example, as described earlier, the robotic arm 115 can include an end effector that can be configured to grab and/or lift boxes from the top of the wall of items 125 in order to place the boxes on the conveyor 180. In other embodiments, the robotic item handler 101 can be configured carry items away from the area 120 instead of placing items 126 on a conveyor 180. In some embodiments, the robotic arm 115 can utilize a manipulator head that uses vacuum to remove items from the wall of items 125. An example of such handling of the items based on grasping the items by the end effector is described later in reference to FIG. 5. As stated earlier, the items stated herein can correspond to any of cartons, shipment containers, packages, and/or the like. In some example embodiments, the items of the wall of items 125 can be of shape of rectangular prisms with at least one face oriented towards the back of the area 120 (e.g., the back of a semi-trailer). Further, the surfaces of the items of the wall of items 125 can be textured or otherwise contain features which the sensor devices (102-108) can adequately observe (e.g., record images with sufficient detail, etc.), details of which are described below.

According to some example embodiments, to handle one or more items, the platform 118 of the robotic item handler 101 can be movable positioned with respect to a portion of the area 120 (e.g. a carriage section or item docking station) inside the cargo truck 121. In this regard, according to some example embodiments, a section of the platform 118 can be moved so as to sweep below a portion of some of the items thereby pulling it onto the platform 118 and further onto the conveyor 180. In other words, the platform 118 of the robotic item handler 101 can be configured to be movably positioned such that a front section of the platform 118 can sweep below a portion of some of the items, thereby pulling up some of the items onto the platform 118 and further onto the conveyor associated with the platform 118. In this aspect, FIGS. 9 and 10 described later provide more details related to the robotic item handler 101.

According to some example embodiments, a computing device 110 can be included in the robotic item handler 101, such as part of a vision system. The computing device 110 can be any electronic device that includes one or more processing units (or processers) capable of executing software, receiving inputs (e.g., signals from the sensor devices 102-108), and/or outputting data. For example, the computing device 110 can be a custom mobile computing device affixed to the robotic item handler 101. As a specific example, the computing device 110 can be a collection of connected computing devices including a computing device, such as a PLC, dedicated to control of the robotic item handler 101 and a computing device, such as a personal computer, dedicated to processing image data from each sensor device (e.g., three computing devices for sensor devices 102-108). In various example embodiments, the computing device 110 can be configured to control the operations of the robotic item handler 101, such as by controlling the operations of the robotic arm 115 and/or receiving inputs from a controller (e.g., joystick, remote system, etc.) to move the robotic item handler 101 within the area 120.

According to some example embodiments, the plurality of sensor devices 102-108 can be coupled to the computing device 110 with wired or wireless connections 103, 105, 107 etc. For example, each of the sensor devices 102-108 can be directly plugged into the computing device 110 via physical wires (e.g., universal serial bus (USB) connections, Firewire connections, etc.) or can be connected wirelessly to via short-range wireless signals (e.g., Bluetooth, Zigbee, Wi-Fi, Wi-Fi Direct, RF, etc.). In some example embodiments, the computing device 110 can include user interface devices (not shown), such as a display, user terminal, etc., capable of displaying data, such as read-outs, application interfaces, and captured sensor data.

As described earlier, according to various example embodiments, the sensor devices 102-108 can be configured to capture various representations of the area 120. In some example embodiments, the sensor devices 102-108 can be capable of generating ranging information based on obtained visual data (e.g., light) and/or audible data, as well as heat data or other forms of energy (e.g., infrared). In some example embodiments, the sensor devices 102-108 can be capable of tracking real-time movement as well as scanning objects three-dimensionally (i.e., 3D scanning). According to some example embodiments, the sensor devices 102-108 can include one or more camera units and/or microphones. In some embodiments, the sensor devices 102-108 can be stereo cameras that include more than one lens and image sensors, and further can include different cameras for different types of data that can be captured, such as an infrared sensor and a color camera. The camera units within the sensor devices 102-108 can include specialized cameras, lens, controllers, and/or software such that the cameras can be capable of obtaining various types of imagery. In some example embodiments, the sensor devices 102-108 can include a camera for capturing color imagery (or "red-green-blue" (RGB)). The sensor devices 102-108 can be capable of sensing (or calculating) depth utilizing captured and processed visuals from cameras and/or audio from microphones. In some embodiments, the sensor devices 102-108 can include infrared laser projectors along with monochrome complementary metal-oxide semiconductor (CMOS) sensors that can be capable of recording 3D data.

In some embodiments, the sensor devices 102-108 can include batteries and/or can be connected to a power source, such as by being coupled to a battery unit included within the robotic item handler 101. Further, the sensor devices 102-108 can include various input and output ports or interfaces, such as USB ports and other elements configured to enable data to be received and/or stored within the sensor devices 102-108. In some example embodiments, the sensor devices 102-108 can be capable of recording LIDAR data. In some example embodiments, the sensor devices 102-108 can be commercially-available sensor devices, such as Microsoft Kinect™ sensors (e.g., Kinect Version 1, Kinect Version 2, etc.). In some embodiments, the robotic item handler 101 can include stereo camera(s), monocular cameras, and/or LIDAR sensor units (e.g., two-dimensional (2D) LIDAR sensor units). In some embodiments, the sensor devices 102-108 can be independent monocular cameras mounted as stereo pair stereo baseline. Further, in some example embodiments, a speed of movement of the robotic item handler 101 can be controlled or limited in order to improve synchronizing operations of the sensor devices 102-108 to the computing device 110.

In some embodiments, the computing device 110 can include a transceiver capable of exchanging signals with a router device 132 (e.g., a Wi-Fi router) via a wireless connection 112. The router device 132 can be associated with a local area network (LAN) 130 than can be connected to a wide area network (WAN), such as the Internet 150 via a connection 131. In some embodiments, the computing device 110 can be connected to the router device 132 with a wired connection 113. In some embodiments, the computing device 110 can include a transceiver capable of exchanging signals with a base station 142 via a wireless connection 109. The base station 142 can be associated with a cellular network 140 that is connected to the Internet 150 via a connection 141.

In various embodiments, the computing device 110 can be configured to communicate with a remote device 160 via the various networks 130, 140. The remote device 160 can be connected to the local area network 130 via a wired or wireless connection 162 and/or can be otherwise connected to the Internet 150 via a wired or wireless connection 161. Through these communication links, the computing device 110 and the remote device 160 can be capable of exchanging various data, such as cargo reports based on unloading operations performed in the area 120. For example, the remote device 160 and the computing device 110 can be configured to communicate via a common local area network (LAN), such as by exchanging peer-to-peer communications via the LAN 130 within a distribution center. In some embodiments, the computing device 110 can be connected directly to the remote device 160 via a wired or wireless connection 114.

In various embodiments, the remote device 160 can be one or more computing devices (e.g., servers, desktop computers, laptops, etc.) that can be configured to store, process, retrieve, and otherwise handle data related to unloading cargo. For example, the remote device 160 can be a warehouse management server connected to a database(s) and configured to execute software for organizing the delivery of cargo from the area 120 to various departments or sections within a distribution warehouse. In some embodiments, the computing device 110 and the remote device 160 can exchange data between themselves, as well as other devices (e.g., scanners, remote sensors, actuators, diagnostic systems, material handling equipment controls (such as conveyor controls), data stores, scales, printers, etc.) via various network connections, including TCP/IP connections, Ethernet connections, Ether cat connections, PROFIBUS connections, RS 232 connections, USB connections, Wi-Fi connections, cellular connections, etc.

According to some example embodiments, the robotic item handler 101 can include various mounting options for mounting the various sensor devices 102-108. In an example embodiment, the sensor devices 102-108 can be positioned on one or more of: a frame, the robotic arm 115, the platform 118 etc., of the robotic item handler 101. According to some example embodiments, the sensor devices 102-108 can be placed so that the placement can be beneficial in making mutual calibration simpler amongst the sensor devices 102-108. In this regard, a location of the sensor devices 102-108 can be so as to capture most complete and/or relevant view of the area 120 including the wall of items 125.

In accordance with some example embodiments described herein, the robotic item handler 101 can be capable to operate according to one or more operating modes for which the robotic item handler 101 is configured. In an example embodiment, the robotic item handler 101 can be configured to operate in two operating modes i.e. a first operating mode and a second operating mode. In the first operating mode, the end effector of the robotic arm 115 of the robotic item handler 101 can be actuated to pick an item by grasping a portion of the item. Further, in the second operating mode, a section (e.g. a front/leading end) of the platform 118 of the robotic item handler 101 can be actuated and moved so as to sweep below a portion of a pile of items (e.g. the wall of items 125), thereby, pulling one or more of items of the pile of items on the platform 118 and further guiding the one or more items onto the conveyor 180. In other words, the first operating mode of the robotic item handler 101 can be associated with picking an item by grasping the item using the robotic arm 115 and the second operating mode of the robotic item handler 101 can be associated with sweeping a pile of items from an item docking station (e.g. the area 120) using the platform 118 of the robotic item handler 101. According to various example embodiments described herein, a selection of the operating mode of the robotic item handler 101 can be performed based on utilizing a machine learning model, details of which are later described in reference to FIGS. 2-11.

Figure 2:
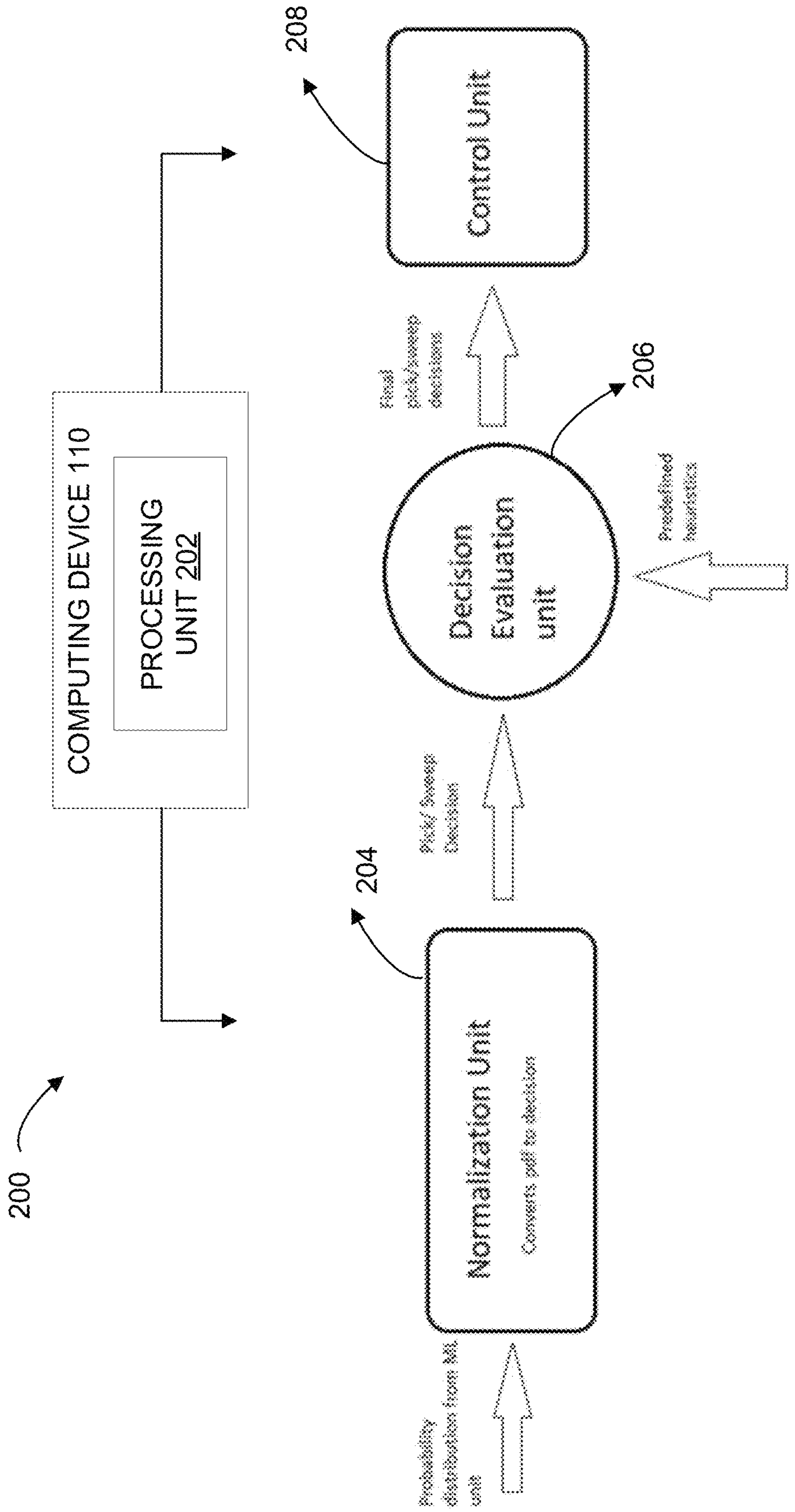
FIG. 2 illustrates an example scenario of a machine learning model based decision making to select an operating mode of a robotic item handler, in accordance with an example embodiment.

FIG. 2 illustrates an example scenario 200 of a machine learning model based decision making to select an operating mode of a robotic item handler, in accordance with an example embodiment. According to some example embodiments described herein, a computing device (e.g. the computing device 110) that may be communicatively coupled to the robotic item handler 101 can include a processing unit 202 that can perform various operations related to decision making for selecting an operation mode of the robotic item handler 101. As described earlier in reference to FIG. 1, in some examples, the operating modes associated with the robotic item handler 101 can correspond to use of either the robotic arm 115 for picking one or more items or the platform 118 to sweep the one or more items.

According to an example embodiment, a system that can perform such machine learning model based decision making can include several hardware and/or software/firmware components including, but not limited to, the processing unit 202, a normalization unit 204, a decision evaluation unit 206, and a control unit 208. As illustrated, the processing unit 202 can be communicatively coupled, via a communication network, to the normalization unit 204, the decision evaluation unit 206, and the control unit 208.

According to the example embodiment, the normalization unit 204 can receive a probability distribution function that can be associated with one or more operating modes of the robotic item handler 101. The probability distribution function can be an output of a machine learning model. In this regard, the machine learning model can be constructed by a machine earning engine that can be coupled to the processing unit 202. An example of machine learning engine and a machine learning model is described later in reference to FIG. 4. Further, the normalization unit 204 can be configured to convert this information (i.e. in form of probability distribution function) to a decision. The decision may indicate a selection of an operating mode of the robotic item handler 101. As an example, the decision can indicate a selection to actuate the robotic arm 115 of the robotic item handler 101 to perform handling (e.g. picking) of items. In another example, the decision can indicate selection to actuate the platform 118 of the robotic item handler 101 to sweep items onto a portion of the robotic item handler 101.

According to the said example embodiment, the decision evaluation unit 206 can perform an evaluation of the decision i.e. the output by the normalization unit 204. In this regard, according to some example embodiments, a decision to select the operating mode of the robotic item handler 101 may be evaluated based on several factors. Said differently, the decision can be evaluated based on the output of the machine learning engine and/or several other factors. As illustrated, the decision evaluation unit 206 may evaluate the decision to select the operating mode of the robotic item handler 101 based on some pre-defined heuristics in addition to the output by the machine learning. According to some examples, the pre-defined heuristics can be associated with past operations of the robotic item handler 101. In other words, the pre-defined heuristics can correspond to a set of rules or methodology followed to select the operating mode of the robotic item unloader over a period of time according to varying external conditions (e.g. related to stacking or placement of the items). Below paragraph describes some examples of pre-defined heuristics that can be used for evaluation of decision to select the operating mode of the robotic item handler 101.

In some example embodiments, the pre-defined heuristics may be associated with co-ordinates of one or more items in a three-dimensional space (e.g. co-ordinates corresponding to boxes or cartons) identified for picking by the robotic item handler 101. Further, in some example embodiments, a decision of the operating mode according to the pre-defined heuristics can be so as to ensure that maximum number of boxes can be picked in a single action (i.e. robotic operation). In this regard, in some examples, an item perceived at a maximum distance from a sensor device (i.e. item associated with maximum z co-ordinate distance) can be selected for picking so that a region of interest created around that item can cause picking of maximum number of items. Further, in some example embodiments, the pre-defined heuristics may involve forward scanning or picking of the items layer by layer in a pile or wall stacking of the items. Further, in some example embodiments, the pre-defined heuristics may also be based on several factors that can impact a safety of the robotic item handler 101 while movement or operation of one or more mechanical components (e.g. robotic arm 115 and/or the platform 118) of the robotic item handler 101. For instance, a rule according to the pre-defined heuristics may include deciding an operating mode of the robotic item handler 101 so that any of the mechanical component doesn't hit side walls or cause obstructions during the movement of the robotic item handler 101. Further, in some example embodiments, the pre-defined heuristics may also include a rule that can ensure that the robotic arm 115 may not be used to pick objects which are at lower heights (i.e. avoid low picks). In this regard, the pre-defined heuristics may include the rule indicating that items identified at a height below a pre-defined height at item docking station can be handled by the platform 118 by performing a sweeping operation. More details related to the evaluation of the decision based on the machine learning model are described later in reference to FIG. 8.

Accordingly, the decision evaluation unit 206 can perform the evaluation to provide a final decision of the selection of the operating mode of the robotic item handler 101 to the control unit 208. Further, based on the final decision, the control unit 208 can generate one or more commands to actuate one or more mechanical components (e.g. the end effector of the robotic arm and/or the platform 118) of the robotic item handler 101 to perform a desired operation.

Figure 3:
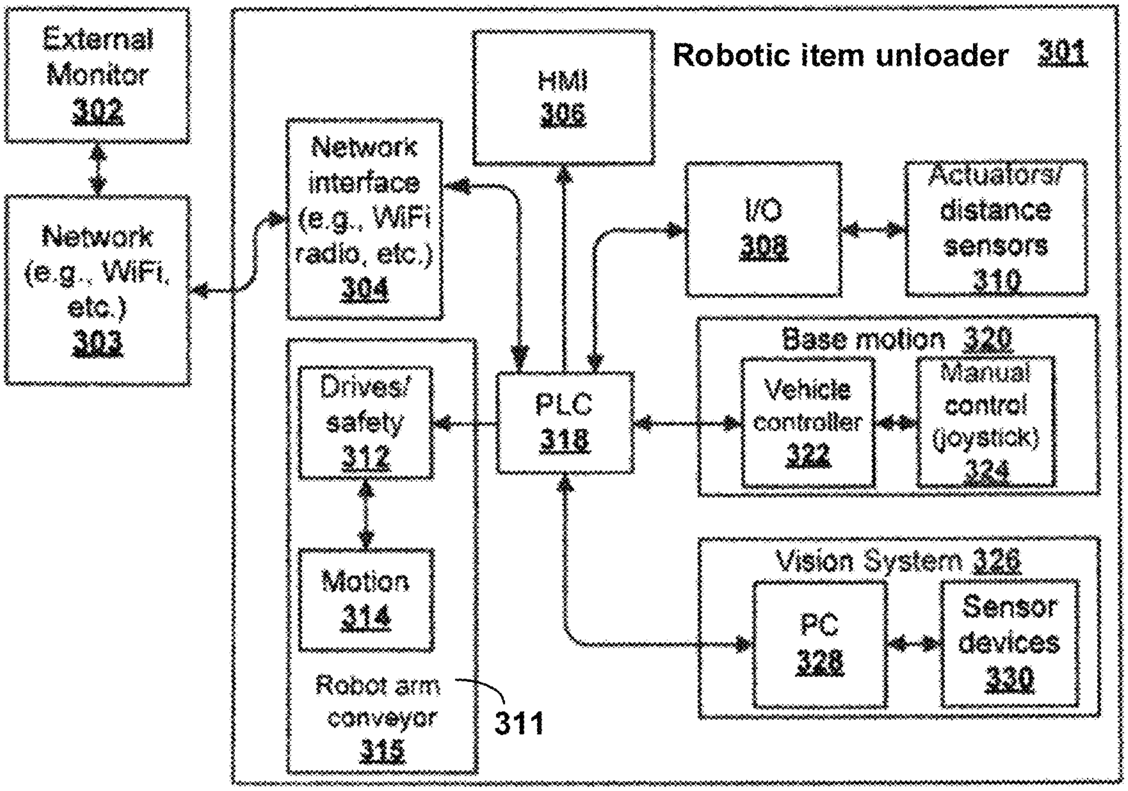
FIG. 3 illustrates a component block diagram of elements of a robotic item handler, in accordance with an example embodiment.

FIG. 3 illustrates a component block diagram of elements of a robotic item unloader 301, in accordance with various example embodiments described herein. In an example embodiment, the robotic item unloader 301 may correspond to the robotic item handler 101 as described in FIG. 1. Illustratively, the robotic item unloader 301 can include various components such as, an external monitor 302, a network interface module 304, a human machine interface (HMI) module 306, an input/output module (I/O module 308), an actuators/sensors module 310, a conveyor system 315 that can include a robotic arm 311, a drive/safety module 312, and a motion module 314. Further, the robotic item unloader 301 can include a processing device such as, a programmable logic controller (PLC) 318. Furthermore, the robotic item unloader 301 can include a base motion module 320 that can include a vehicle controller module 322 and a manual control module 324. Furthermore, the robotic item unloader 301 can include a vision system 326 (or visualization system) that can include one or more computing devices 328 (or "PCs") and sensor devices 330. According to some example embodiments, the sensor devices 330 referred herein can correspond to one or more sensor devices (102-108) as described earlier in FIG. 1. In some example embodiments, vision system 326 of the robotic item unloader 301 can include a PC 328 connected to each sensor device 330. The sensor devices 330 can include one or more depth cameras, color cameras, and/or the like that are capable of capturing one or more 3D images. As an example, the sensor devices 330 can be configured to capture 3D images of the environment where the robotic item unloader 301 is to be used. Further, the vision system 326 can construct point cloud data from the images captured by the sensor devices 330.

In some example embodiments, more than one sensor device 330 can be present on the robotic item unloader 301. In this regard, the PCs 328 for each sensor device 330 can be networked together and one of the PC's 328 can operate as a master PC 328. The master PC 328 can receive data (e.g. point cloud data) from the other connected PC's 328 and can further perform data processing on the received data to generate a combined point cloud data. Alternatively, in some example embodiments, the sensor devices 330 can be communicatively coupled to an external processing device which can access the image data from various sensor devices 330 and generate the combined point cloud data from the image data.

According to some example embodiments, the robotic item unloader 301 can be capable of connecting to remote locations or systems with a network interface module 304 (e.g., a Wi-Fi radio, etc.) via a network 303, such as a local area Wi-Fi network. In some examples, the network interface module 304 can enable the robotic item unloader 301 to connect to an external monitor 302. The external monitor 302 can be anyone of a remote warehouse or distribution center control room, a handheld controller, or a computer, and can provide passive remote viewing through the vision system 326 of the robotic item unloader 301. Alternately, in some example embodiments, the external monitor 302 can override the programming inherent in the vision system 326 and assume active command and control of the robotic item unloader 301.

According to some example embodiments described herein, programming for the robotic item unloader 301 can also be communicated, operated and debugged through external systems, such as the external monitor 302. Some examples of an external monitor 302 that assumes command and control can include a remotely located human operator or a remote system, such as a warehouse or distribution server system (i.e., remote device 160 as described above). According to some examples, the external monitor 302 can include any of: a visual monitor, a keyboard, a joystick, an i/o port, a cd reader, a computer, a server, a handheld programming device, or any other device that can be used to perform various operations.

According to some example embodiments, the robotic item unloader 301 can include the HMI module 306 that can be used to control and/or receive output information for the robotic arm 311 and conveyor system 315 and/or the base motion module 320. In some examples, the HMI module 306 can be used to control (or can itself include) a joystick, a display, and a keypad that can be used for re-programming, over-riding the autonomous control of the machine, and driving the robotic item unloader 301 from point to point. According to some example embodiments, the actuators 310 that can be actuated individually or in any combination by the vision system 326, and the distance sensors can be used to assist in guiding one or more parts of the robotic item unloader 301 into an unloaded area (e.g. an item carriage section of a trailer).

According to some example embodiments, the I/O module 308 can connect the actuators and distance sensors to the PLC 318. The robotic arm 115 and conveyor system 315 can include all components needed to move the arm and/or the conveyor, such as drives/engines and motion protocols or controls. The base motion module 320 can be the components for moving the entirety of the robotic item unloader 301. In other words, the base motion module 320 can be the components needed to steer the vehicle (i.e. the robotic item unloader 301) into and out of unloading areas.

According to some example embodiments, the PLC 318 that can control the overall electromechanical movements of the robotic item unloader 301 or control exemplary functions, such as controlling the robotic arm 311 or a conveyor system 315. For example, the PLC 318 can move a manipulator head (i.e. an end effector) of the robotic arm into position for obtaining items (e.g., boxes, cartons, etc.) from a wall of items. An example of the end effector of the robotic arm 311 is described further in reference to FIG. 5. In other example embodiments, instead of the PLC 318, an external processing device such as, the computing device 110 etc. can perform similar operations of controlling the overall electromechanical movements of the robotic item unloader 301 or exemplary functions, such as controlling the robotic arm 311 and/or the conveyor system 315.

According to some example embodiments, the PLC 318 and other electronic elements of the vision system 326 can be mounted in an electronics box (not shown) that can be located under a conveyor, adjacent to a conveyor, or elsewhere on the robotic item unloader 301. The PLC 318 can operate all or part of the robotic item unloader 301 autonomously and can receive positional information from the distance sensors. The I/O module 308 can connect the actuators and the distance sensors to the PLC 318.

According to some example embodiments, the robotic item unloader 301 can include a vision system 326 that can include the sensor devices 330 (e.g., cameras, microphones, 3D sensors, etc.) and one or more computing device 328 (referred to as a personal computer or "PC" 328). The robotic item unloader 301 can use the sensor devices 330 and the one or more PC 328 of the vision system 326 to scan in front of the robotic item unloader 301 in real time or near real time. According to some example embodiments, forward scanning by the sensor devices 330 can be triggered in response to determining an event related to the robotic item unloader 301. As an example, the forward scanning can be initiated by a trigger sent in response to the robotic item unloader 301 being in position to begin detecting cartons in an unloading area. According to some example embodiments, the sensor devices 330 can be configured to perform the forward scanning which can be used for various purposes e.g., but not limited to, collision avoidance, human shape recognition (safety), sizing unloaded area (e.g., the truck or trailer), and for scanning the floor of the unloaded area for loose items (e.g., cartons, boxes, etc.).

According to some example embodiments, 3D sensing capabilities of the vision system 326 can also provide depth perception, edge recognition, and can create a 3D image of a wall of items (or carton pile). According to some example embodiments, the vision system 326 can operate alone or in concert with the PLC 318 and/or the computing device 110 to recognize edges, shapes, and the near/far distances of articles in front of the robotic item unloader 301. For example, the edges and distances of each separate carton in the wall of items can be measured and calculated relative to the robotic item unloader 301. In some examples, based on such measurements the vision system 326 can operate to can select specific or all items for removal from a pile of items.

According to some example embodiments, the vision system 326 can be configured to provide information such as: specific XYZ coordinate locations of one or more items (e.g. cartons) targeted for removal from the unloading area. In some example embodiments, the coordinate locations can also correspond to one or more movement paths for the robotic arm 115 or the mobile body of the robotic item unloader 301 to travel.

While various computing devices and/or processors in FIG. 3, such as the PLC 318, vehicle controller 322, and PC 328, have been described separately, in the various embodiments discussed in relation to FIG. 3 and all the other embodiments described herein, the described computing devices and/or processors can be combined and the operations described herein performed by separate computing devices and/or processors can be performed by less computing devices and/or processors, such as a single computing device or processor with different modules performing the operations described herein. As examples, different processors combined on a single circuit board can perform the operations described herein attributed to different computing devices and/or processors, a single processor running multiple threads/modules can perform operations described herein attributed to different computing devices and/or processors, etc.

Other robotic carton unloader embodiments and component descriptions suitable for use in accordance with the various embodiments are described in U.S. Provisional Patent Application No. 61/894,889, entitled "Robotic Carton Unloader with Visualization System," and filed on Oct. 23, 2013, U.S. Provisional Patent Application No. 61/973,188, entitled "Robotic Truck Loader with Alternate Vacuum Head," filed on Mar. 31, 2014, U.S. Non-Provisional patent application Ser. No. 14/279,694, entitled "Robotic Carton Unloader," and filed on Can 16, 2014, and U.S. Non-Provisional patent application Ser. No. 14/445,929, entitled "Robotic Carton Unloader," and filed on Jul. 29, 2014. The entire contents of all four applications are incorporated by reference herein in their entirety.

Figure 4:
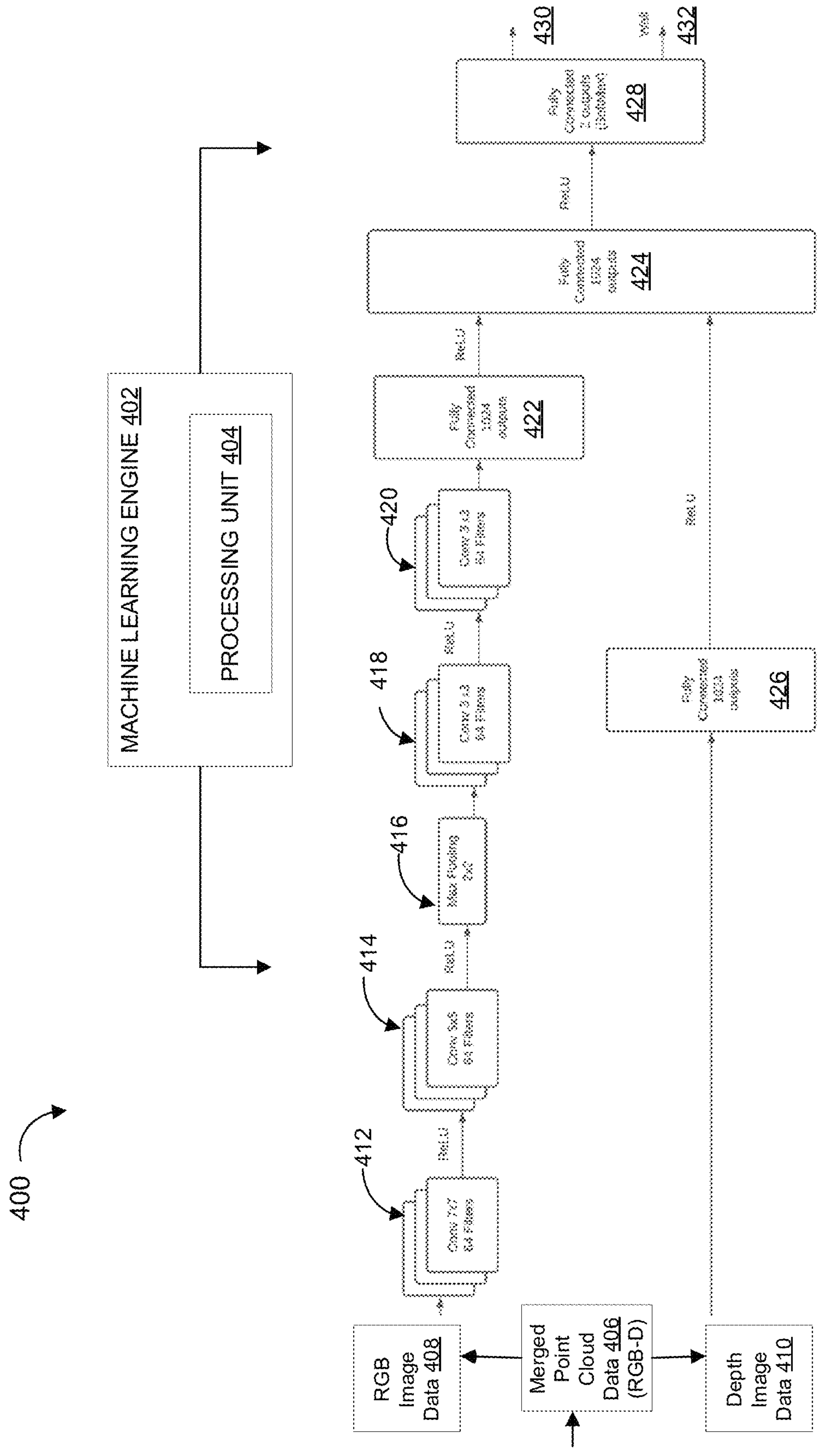
FIG. 4 illustrates an example architecture of a machine learning model used for making a decision on an operating mode to control a robotic item handler, in accordance with an example embodiment.

FIG. 4 illustrates an example architecture 400 of a machine learning model used for making a decision to select an operating mode of controlling a robotic item unloader (e.g. the robotic item handler 101). According to an example embodiment, the machine learning model can output a decision classification. The decision classification can include a probability distribution function indicating one or more probabilities associated with a decision to select amongst various operating modes associated with the robotic item handler 101. For example, the decision classification can be a classification of a first probability to select a first operating mode (e.g. picking by the robotic arm) or a second probability to select a second operating mode (e.g. sweeping by the platform), of the robotic item handler 101. According to the example embodiment, the machine learning model can be generated by a machine learning engine 402. In an example embodiment, the machine learning engine 402 can be deployed by the computing device 110, as described in reference to FIG. 1. The machine learning engine 402 can include its own processing unit 404. In some example embodiments, the machine learning engine 402 can be communicatively coupled to an external processing unit such as, processing unit 202 or PLC 318 of the computing device 110.

According to the said example embodiment, the machine learning engine 402 can employ one or more machine learning processes and/or one or more artificial intelligence techniques to generate the machine learning model. The machine learning model can assist in selection of an operating mode from amongst several operating modes, to operate the robotic item handler 101. According to some example embodiments, the machine learning engine 402 is based on an input data that can be processed through one or more layers of a neural network architecture to output the decision classification which can assist a processing device in selecting the operating mode and commanding operation according to the selected operating mode to operate the robotic item handler 101.

According to an example embodiment, the machine learning engine 402 can construct a machine learning model which can be based on a convolutional neural network (CNN). In this regard, the machine learning engine 402 can use a combined point cloud data, as an input to the CNN. As described earlier, the combined point cloud data can correspond to a point cloud that can be obtained after merging a plurality of point cloud data corresponding to several 3D images that can be captured by different sensor devices associated with the robotic item handler 101. For instance, in an example embodiment, the combined point cloud can be obtained by transforming first point cloud data related to a first three-dimensional image captured by a first sensor device (e.g. sensor device 106 associated with the robotic arm 115) and second point cloud data related to a second three-dimensional image captured by a second sensor device (e.g. sensor device 104 and/or 106 associated with the platform of the robotic item handler 101). Further details of generating combined point cloud data are described in reference to FIG. 8.

As stated earlier, the machine learning model generated by the machine learning engine 402 can output the decision classification that can indicate a probability associated with an operating mode to operate the robotic item handler. In an example, the machine learning engine 402 can output the decision classification indicating a first probability associated with a first operating mode (e.g. operating the robotic arm for picking items) of the robotic item handler and a second probability associated with a second operating mode (e.g. operating the platform of the robotic item handler for sweeping items). Accordingly, the output of the machine learning model can be used to selecting the operating mode to operate the robotic item handler 101. For instance, in an example, the robotic item handler 101 can be operated according to the first operating mode, if the first probability outputted by the machine learning model is higher than the second probability. Alternatively, the robotic item handler 101 can be operated according to the second operating mode if the second probability outputted by the machine learning model is higher than the first probability.

According to various example embodiments, to generate and train the machine learning model, the machine learning engine 402 can employ various techniques. For instance, in some examples, support vector machine (SVM) classifier can be used by the machine learning engine 402 to determine one or more classifications, one or more correlations, one or more expressions, one or more inferences, one or more patterns, one or more features and/or other learned information from the input data (i.e. the combined point cloud). In another example embodiment, the machine learning engine 402 can employ one or more machine learning classification techniques such as, but not limited to, techniques associated with a Bayesian machine learning network, a binary classification model, a multiclass classification model, a linear classifier model, a quadratic classifier model, a neural network model, a probabilistic classification model, decision trees and/or one or more other classification models. According to some example embodiments, the machine learning model (e.g., the classification model, the machine learning classifier, etc.) employed by the machine learning engine 402 can be explicitly trained (e.g., via training data) and/or implicitly trained (e.g., via extrinsic data received by the machine learning model). For example, the machine learning model (e.g., the classification model, the machine learning classifier, etc.) employed by the machine learning engine 402 can be trained with training data that can include the combined point cloud data. In some examples, the training data can also include one or more samples of pre-defined heuristics associated with past operational modes of the robotic item handler 101. In this regard, the pre-defined heuristics may include previous selection of operation modes of the robotic item handler 101, in various past scenarios (e.g. to handle items stacked in various formations like pile, wall, scattered, etc.).

In an example embodiment, the machine learning engine 402 can implement a convolutional neural network (CNN) that may include multiple partially or fully connected neural network layers. The network layers of the CNN can be based on one or more convolutional filters and/or pooling functions. FIG. 4 depicts one such example illustration of a neural network that can be implemented by the machine learning engine 402 to construct and train the machine learning model. According to an example embodiment, as illustrated, the input to the CNN can be merged point cloud data 406 (e.g. the combined point cloud data, as described earlier). In this regard, the merged point cloud data 406 can correspond to the combined point cloud, as described earlier (i.e. point cloud which is derived after combining point cloud data from various sensor devices (102-108) associated with the robotic item handler 101). In some example embodiments, as illustrated, a first portion from the merged point cloud data 406 can include 3 channels of RGB information (referred herein as RGB image data 408) and a second portion from the merged point cloud data 406 can include an additional channel of depth information (referred herein as depth image data 410). As illustrated, the RGB image data 408 can be processed through a first set of layers of the CNN and the depth image data 410 can be processed through a second set of network layer of the CNN. In other words, information pertaining to RGB channels and depth channel from the merged point cloud data, can be processed through separate layers of the neural network by the machine learning engine 402.

According to some example embodiments described herein, the input data to the CNN (i.e. the merged point cloud data 406) can be initially normalized for training the machine learning model. Further, the input data can be passed through a set of convolution layers, max pooling layers, and finally passed through a fully connected layer with conjunction to a SoftMax layer to obtain class probability distributions as output of the machine learning model.

Illustratively, in accordance with the example embodiment, the RGB image data 408 of the merged point cloud data 406 can be processed through a first set of convolutional 7*7 64 filters 412, further through a second set of convolutional 5*5 64 filters 414, furthermore through a max pooling layer 416, furthermore through a first set of convolutional 3*3 64 filter layer 418 and a second set of 3*3 64 filter layer 420, and finally through a first fully connected 1024 output layer 422 and a second fully connected 1024 output layer 424. In an example embodiment, rectified linear units (ReLU) function can be used as an activation function throughout the network layers of the CNN. Alternatively, other known activation functions can also be used. In accordance with the example embodiment, the second portion of the merged point cloud data 406 (i.e. the depth image data 410) can be processed through a channel of CNN separate from the layers which are used to process the first portion. As illustrated, the depth image data 410 can be an input to a third fully connected output 1024 layer 426 and further to the second fully connected 1024 output layer 424. Furthermore, the output of the second fully connected 1024 output layer 424 can be provided as an input to a SoftMax fully connected 2 outputs network layer 428. Accordingly, during the inferencing based on the processing of the input data (i.e. the merged point cloud data 406) through the CNN, the machine learning engine 402 can system can provide an output a decision classification. As stated earlier, the decision classification is indicative of a first probability associated with a first operation mode of the robotic item handler 101 and a second probability associated with a second operation mode of the robotic item handler 101.

According to an example embodiment, the CNN can process the input data, identify a scenario from the input data, and can provide a probability classification output as pile 430 and wall 432. The classification outputted by the CNN can be in terms of probability distribution which can be derived from every iteration of image accumulation and indicates a type of stacking of items identified from the image data. Illustratively, as an example, the output pile 430 by the CNN can be indicative of a pile type stacking of items and the output wall 432 by the CNN can be indicative of a wall type stacking of items. Accordingly, the output of the CNN can be the decision classification indicating a probability distribution of the two or more classes, e.g. the pile 430 and the wall 432. According to various example embodiments described herein, a probability distribution output (i.e. the decision classification) from the machine learning model based on the CNN can be converted (e.g. by the computing device 110) to a next action that can be performed by the robotic item handler 101. For instance, the output by the CNN can be used by the computing device 110 to operate the robotic item handler 101 to operate in either of the first operating mode (i.e. perform a picking operation by using the robotic arm 115) or the second operating mode (i.e. perform a sweeping operation by using the platform of the robotic item handler 101). As an example, if the decision classification indicates the first probability associated with the output pile 430 is higher than the second probability associated with the output wall 432, the robotic item handler 101 can be operated based on the first operating mode. Alternatively, if the decision classification indicates the first probability associated with the output pile 430 is lesser than the second probability associated with the output wall 432, the robotic item handler 101 can be operated based on the second operating mode.

According to some example embodiments, various other factors along with the output of the machine learning model can be evaluated to select the operating mode of the robotic item handler 101. In other words, the output of the machine learning model can be evaluated along with several other factors to decide the operating mode of the robotic item handler 101, details of which are described in the description with reference to FIGS. 2 and 8.

FIG. 5 illustrates a view of an exemplary end effector 500 of the robotic arm 115 of the robotic item handler 101, in accordance with an example embodiment described herein. As described earlier, the robotic item handler 101 can be operated in the first operating mode in which the robotic arm 115 of the robotic item handler 101 can be actuated to pick one or more items. In this regard, in the first operating mode, the end effector 500 of the robotic arm 115 can be actuated to pick the one or more items based on grasping of the items. FIG. 5 illustrates the first operating mode of the robotic item handler 101 in which the end effector 500 approaches a pile or wall of items 502. As illustrated, a plurality of items (504-1, 504-2 . . . 504-$n$) such as, but not limited to, cartons, packages, containers etc. may be piled one over another or stacked in any arrangement, in an item docking station 503 (e.g. a carriage section of a truck).

As stated earlier, the end effector 500 can pick one or more items by grapping a portion of the items. Illustratively, the end effector 500 may include a plurality of vacuum cups 506-1 . . . 506-$n$ that may be configured to grasp a portion of an item by vacuum suction force. In this aspect, each vacuum cup of the plurality of vacuum cups 506-1 . . . 506-$n$ that can be mounted at an end of a respective guide rod 508. Further, each guide rod 508 may be slidably mounted in a guide frame 510. Furthermore, a plurality of springs 512 may be connected between each guide rod 508 and the guide frame 510 to bias the guide rod 508 forward (e.g. towards the pile of items 502).

In accordance with the example embodiment, the end effector 500 coupled to an end of the robotic arm 115 can be moved towards the pile of the items 502 so that one or more of the plurality of vacuum cups 506-1 . . . 506-$n$ can contact one or more of the items 504-1 . . . 504-$n$. Thus, upon making such contact, the vacuum cups 506-1 . . . 506-$n$ based on vacuum suction force can grasp the items. Further, the guide frame 510 may be elevated to lift one or more items (e.g. the items 504-1 and 504-2) from the pile of the items 502 and position on a portion of a conveyor 514 of the robotic item handler and performing an item loading and/or unloading operation. The end effector 500 illustrated in FIG. 5 is one such example of an item handling tool that may be used along with the robotic arm in the first operating mode of the robotic item handler. Alternatively, in other example embodiments, end effectors of type other than the end effector 500 may also be used.

Figure 6:
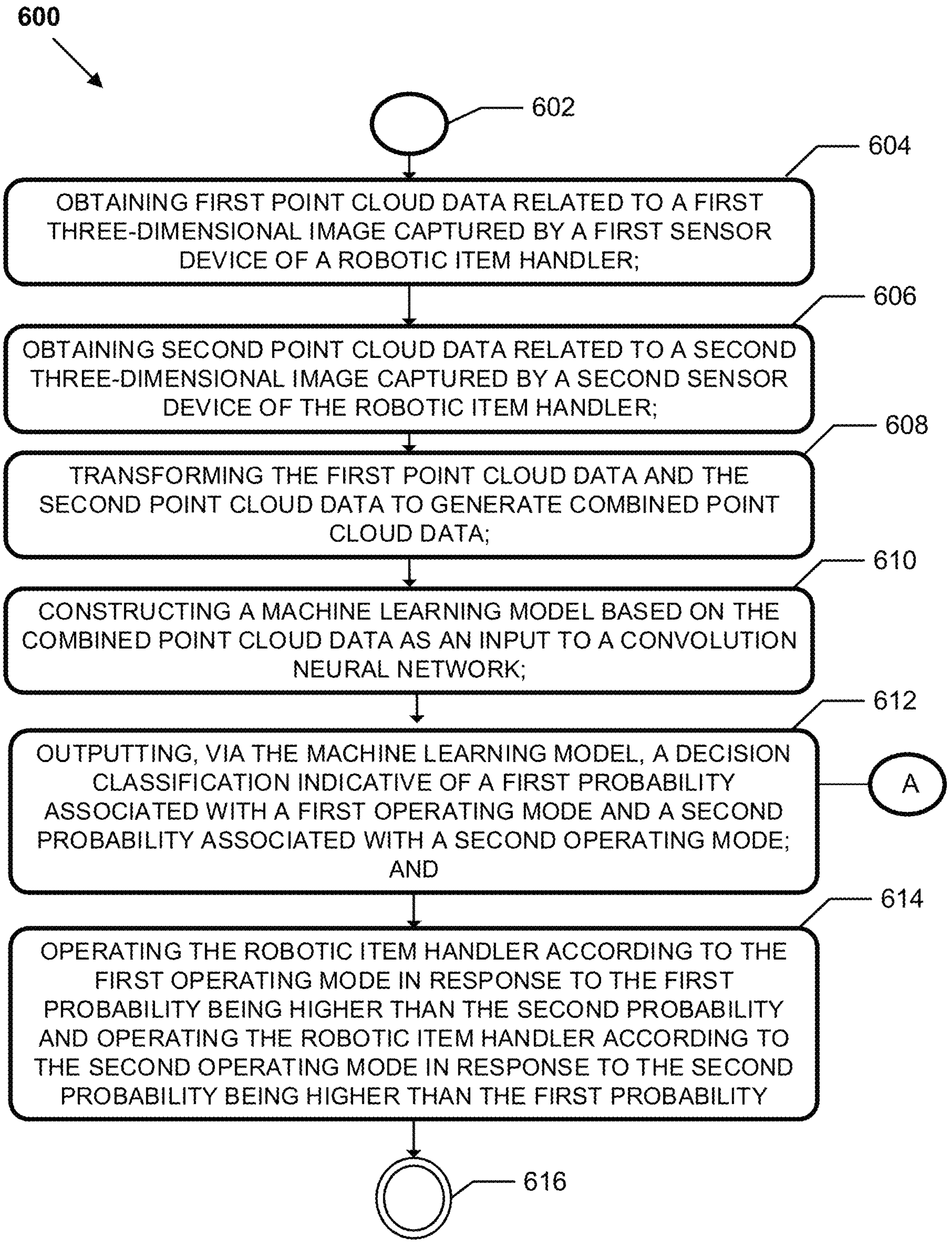
FIG. 6 illustrates a flow diagram representing a method for controlling a robotic item handler, in accordance with an example embodiment.
Figure 7:
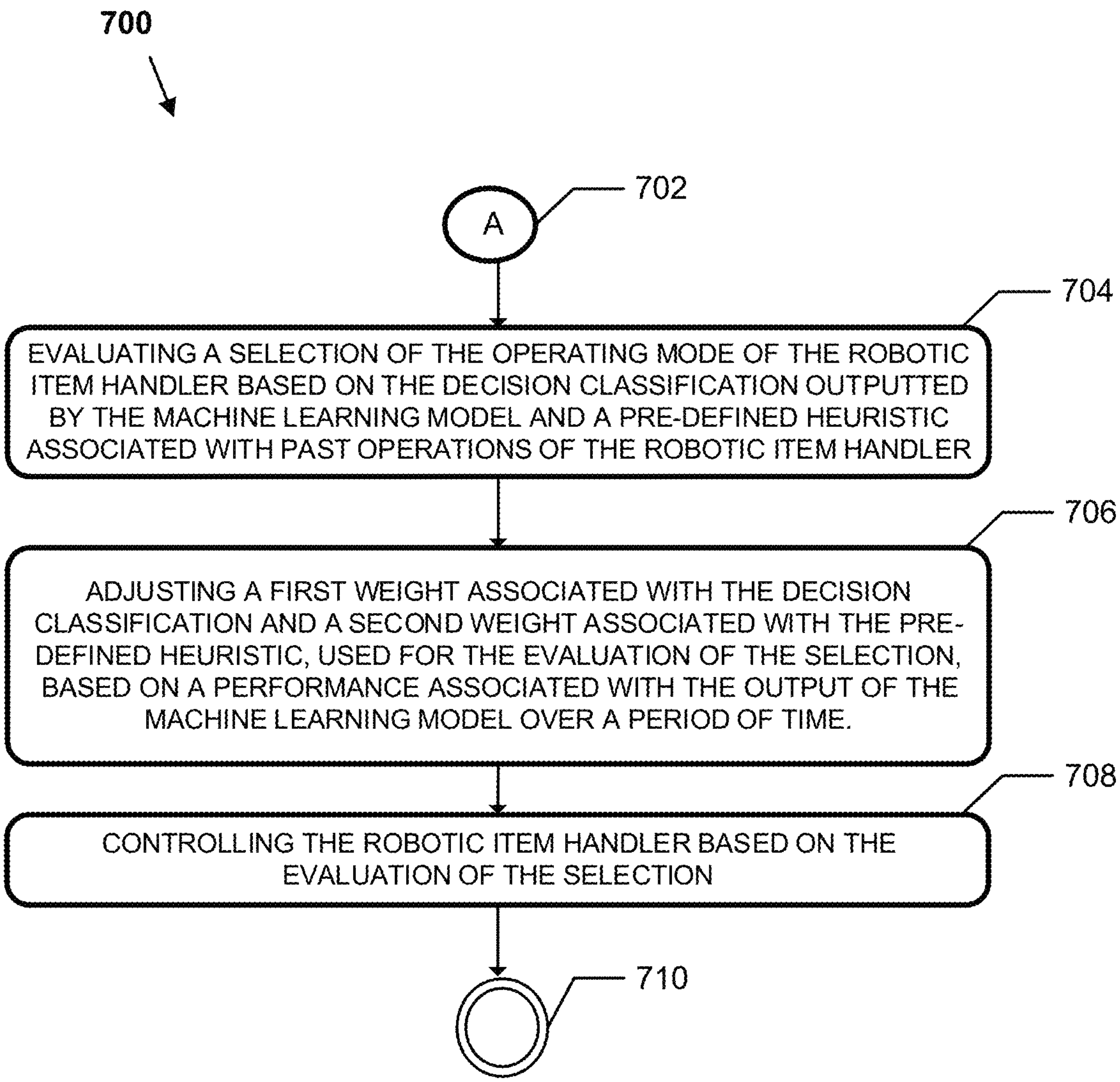
FIG. 7 illustrates a flow chart representing a method for evaluating a decision by a machine learning model to select an operating mode for opening a robotic item handler, in accordance with an example embodiment.

FIGS. 6-7 illustrate example flowcharts of the operations performed by an apparatus, such as the robotic item handler 101 or the robotic item unloader 301, in accordance with example embodiments of the present invention. It will be understood that each block of the flowcharts, and combinations of blocks in the flowcharts, can be implemented by various means, such as hardware, firmware, one or more processors, circuitry and/or other devices associated with execution of software including one or more computer program instructions. For example, one or more of the procedures described above can be embodied by computer program instructions. In this regard, the computer program instructions which embody the procedures described above can be stored by a memory of an apparatus employing an embodiment of the present invention and executed by a processor in the apparatus. As will be appreciated, any such computer program instructions can be loaded onto a computer or other programmable apparatus (e.g., hardware) to produce a machine, such that the resulting computer or other programmable apparatus provides for implementation of the functions specified in the flowcharts' block(s). These computer program instructions can also be stored in a non-transitory computer-readable storage memory that can direct a computer or other programmable apparatus to function in a particular manner, such that the instructions stored in the computer-readable storage memory produce an article of manufacture, the execution of which implements the function specified in the flowcharts' block(s). The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 6-7 when executed, convert a computer or processing circuitry into a particular machine configured to perform an example embodiment of the present invention. Accordingly, the operations of FIGS. 6-7 define an algorithm for configuring a computer or processor, to perform an example embodiment. In some cases, a general purpose computer can be provided with an instance of the processor which performs the algorithm of FIGS. 6-7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

FIG. 6 illustrates a flow diagram representing a method 600 for controlling the robotic item handler 101, in accordance with an example embodiment. The method 600 starts at step 602. At step 604, the robotic item handler 101 may include means such as, a processing unit 202 of the computing device 110 to obtain first point cloud data. The first point cloud data can be related to a first 3D image that can be captured by a first sensor device (e.g. the sensor device 108) of the robotic item handler. In an example, the first sensor device can be located on the robotic arm 115 of the robotic item handler 101. At step 606, the processing unit 202 can obtain second point cloud data related to a second 3D image. The second 3D image can be captured by a second sensor device (e.g. the sensor device 106). The second sensor device can be located on the platform 118 of the robotic item handler 101.

At step 608, the processing unit 202 can transform the first point cloud data and the second point cloud data to generate a combined point cloud data (e.g. the merged point cloud data 406 as described in FIG. 4). In an example, the combined point cloud data may represent a complete or an entire view of an item docking station where the robotic item handler 101 is to perform handling of the items. As an example, the combined point cloud data may correspond to a 3D view of entire carriage section of a truck from where the robotic item handler 101 may pick one or more items for unloading. Details of transformation of the point cloud data to the combined point cloud data are described in reference to FIG. 8.

At step 610, the processing unit 202 can construct a machine learning model based on the combined point cloud data. In this regard, the combined point cloud data may be provided as an input to a convolution neural network. Details of construction of the machine learning model based on the combined point cloud data are described earlier in reference to FIG. 4.

Moving to step 612, the processing unit 202 can output, via the machine learning model, a decision classification. The decision classification can be indicative of a probability associated with an operating mode of the robotic item handler 101. For instance, in an example, the decision classification can be indicative of a first probability associated with the first operating mode of the robotic item handler 101 and a second probability associated with the second operating mode of the robotic item handler 101. Moving to step 614, the processing unit 202 can generate a command to operate the robotic item handler 101. In this aspect, the command to operate the robotic item handler 101 can include one or more configuration settings associated with the operating mode based on which the robotic item handler 101 is to be operated. In accordance with the example embodiment, the command to operate the robotic item handler 101 according to the first operating mode can be generated in response to the first probability being higher than the second probability. Alternatively, the command to operate the robotic item handler 101 according to the second operating mode can be generated in response to the second probability being higher than the first probability. The method 600 stops at step 616.

Accordingly, by way of implementation of the said example embodiment, the robotic item handler 101 may be operated according to an operating mode which can be selected based on the output of machine learning model. In some example embodiments, the selection of the operating mode can be based on an evaluation of the output of the machine learning model and some other additional factors, details of which are described in reference to FIGS. 2 and 7.

FIG. 7 illustrates a flow diagram representing a method 700 for controlling the robotic item handler 101, in accordance with an example embodiment. The method starts at step 702. In some example embodiments, the method 700 can start in response to outputting of the decision classification by the machine learning model, as described at step 612 of FIG. 6. Alternatively, the method 700 can start at any other instance.

At step 704, the robotic item handler 101 may include means such as, the processing unit 202 of the computing device 110 to evaluate a selection of the operating mode of the robotic item handler 101. In this regard, the processing unit 202 may evaluate an operating mode that can be selected for operating the robotic item handler 101. For instance, the processing unit 202 can select if the robotic item handler 101 can be operated based on the first operating mode or the second operating mode. In this regard, as described earlier, the robotic item handler 101 can be operated based on the first operating mode which can involve use of the robotic arm 115 to handle the items (i.e. by grabbing a portion of the items). Alternatively, the robotic item handler 101 can be operated based on the second operating mode which can involve use of the platform 117 to handle the items (i.e. by sweeping below a portion of the items). According to some example embodiments, the selection of the operating mode can be based on an evaluation that can be performed for example, by the processing unit of the computing device 110. Some details related to the evaluation stated herein are described earlier in reference to description of FIG. 2.

According to the example embodiment, evaluation of the selection of the operating mode may be based on several factors. One such factor may be the decision classification outputted by the machine learning model, as described earlier in FIGS. 1-6. Said differently, according to some example embodiments, the decision classification may not be the sole factor based on which the operating mode of the robotic item handler 101 can be selected.

According to one example embodiment, the processing unit 202 may evaluate the selection of the operating mode of the robotic item handler 101 based on: the decision classification outputted by the machine learning model, a pre-defined heuristic associated with past operations of the robotic item handler 101, and several other factors (e.g., but not limited to, a layout of the material handling environment, safety measures associated with operation of the robotic item handler 101, structural characteristics associated with the items like fragile, consumable etc.). According to some example embodiments, the pre-defined heuristic referred herein may correspond to one or more rules or methodology followed by one or more operators over a period of time while working in a material handling site to operate the robotic item handler 101 in various conditions (e.g. related to stacking or placement of the items). As an example, the pre-defined heuristic may include one or more rules defined by engineers to operate the robotic item handler 101 as per engineering standards or guidelines. Some examples of the pre-defined heuristics to evaluate the decision of selecting the operating mode are described earlier in reference to FIG. 2.

According to the said example embodiment, the processing unit 202 may assign a score or weightage to each of factor which contributes to the selection of the operating mode of the robotic item handler 101. For instance, a score/weightage may be assigned to each of, the pre-defined heuristic, the decision classification, and/or the like to evaluate a selection of the operating mode of the robotic item handler 101.

In an example embodiment, a decision to select the operating mode of the robotic item handler 101 may be based on a weighted average evaluation of multiple factors. For instance, in an example, a first weight may be associated with the decision classification and a second weight may be associated with the pre-defined heuristic. In some examples, the first weight and the second weight can be defined based on a user-input. Alternatively, the first weight and the second weight can be defined dynamically by the processing unit 202. For example, the processing unit may dynamically define the first weight and the second weight according to: a type of item handling operation or an outcome or performance of execution of the task by the robotic item handler 101 according to the operating mode that may have been selected solely using either of the decision classification outputted by the ML model or the pre-defined heuristic.

Moving to step 706, the processing unit 202 can adjust the first weight associated with the decision classification and the second weight associated with the pre-defined heuristic. In some examples, the adjustment to the first weight and the second weight can be dynamically performed by the processing unit. In one example, the adjustment to the weight can be according to the performance associated with the output of the ML model over the period of time. For instance, the processing unit may assign a lesser weightage for the ML model output as compared to weightage to the pre-defined heuristic, during initial stages of training of the ML model. Gradually, as the ML model is trained and utilized for a longer period of time, the processing unit may adjust the first weight associated with the output of the ML model to be higher than the second weight associated with the pre-defined heuristic. Accordingly, the weights associated with the various factors can be adjusted.

At step 708, the processing unit 202 can generate command to control the robotic item handler 101 based on the evaluation of the selection of the operating mode, as described at steps 704 and 706. Thereafter, based on the command one or more components (e.g. the robotic arm 115 or the platform 117) of the robotic item handler 101 can be actuated to perform handling (e.g. loading and/or unloading) of the items. The method stops at step 710.

Figure 8:
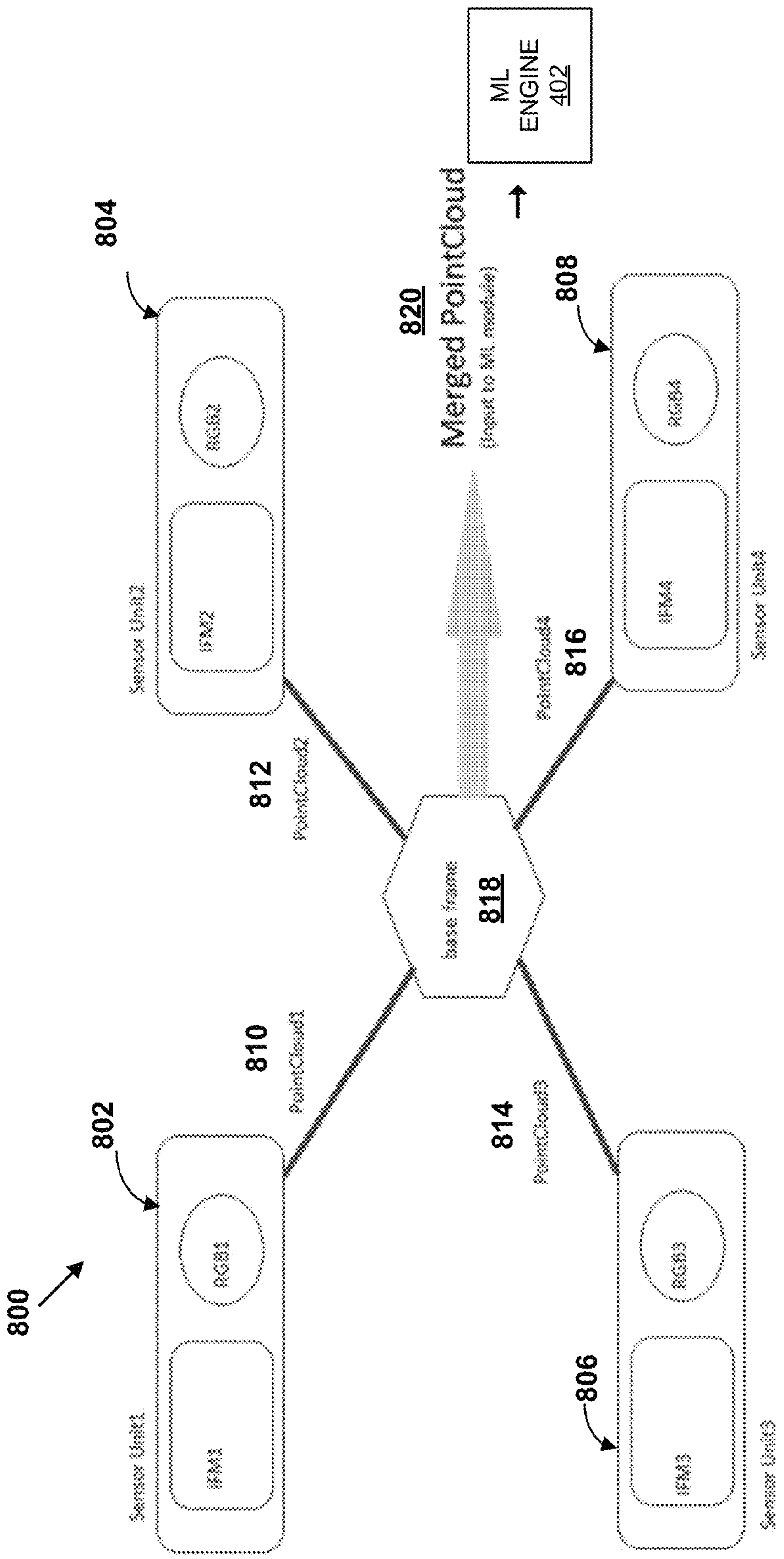
FIG. 8 illustrates an example scenario representing generation of a combined point cloud based on data from various sensor devices associated with a robotic item handler, in accordance with an example embodiment.

FIG. 8 illustrates the example scenario 800 of generating the merged point cloud based on inputs from various sensor devices that can be associated with the robotic item unloader. These sensor devices can be configured to perform a forward scanning by capturing one or more images (e.g. 3D images and/or color images) of a portion of environment that can be in front of the robotic item unloader. As an example, FIG. 1 describes the plurality of sensor devices (102-108) positioned at various locations on the robotic item handler 101. In accordance with some example embodiments, image data captured from various sensor devices (e.g. the sensor devices 102-108) can be obtained and transformed to generate the merged point cloud. Further, this merged point cloud data can be used as an input to a CNN based machine learning model which can output a decision classification to select an operating mode of the robotic item unloader. Details of these aspects are described earlier in reference to description of FIGS. 1-7.

Illustratively, according to an example embodiment, there can be four sensor devices (802, 804, 806, and 808) that can be associated with a robotic item unloader (e.g. the robotic item handler 101). In an example embodiment, a first sensor device 802 and a second sensor device 804 can be associated with a top section of the robotic item unloader (e.g. the robotic arm 115 of the robotic item handler 101). Further, a third sensor device 806 and a fourth sensor device 808 can be associated with a bottom section of the robotic item unloader (e.g. the platform 118 of the robotic item handler 101).

Illustratively, each of the sensor devices (802-808) can include an IFM camera and an RGB camera. The IFM camera can be configured to capture images including data in three dimensions (X, Y, and Z axis). In this regard, the IFM camera can correspond to any 3D or depth imaging camera that can capture 3D images of an environment in its respective field of view. In some examples, to capture image data in 3D, the IFM camera can be configured to measure a distance between an IFM sensor of the IFM camera and a nearest surface point in its field of view by point using time-of-flight (TOF) principle. In this regard, the IFM sensor can be configured to illuminate a scene in its field of view with an internal infrared light source and the distance can be calculated by means of using time of travel of the light reflected from that surface. Accordingly, the IFM camera associated with each of the sensor devices (802-808) can capture 3D images. Alternatively, in some example embodiments, other techniques of capturing image information in 3D can be used by the sensor devices (802-808). Further, the RGB camera of each of the sensor devices (802-808) can be configured to capture color images of a scene in its field of view. In some example embodiments, color image information obtained from the RGB camera can be used to distinctly identify different objects (e.g. characteristics of cartons, packages) in the scene. Further, in some example embodiments, RGB information obtained from an RGB camera of the sensor device can be are mapped back to a depth frame of a respective sensor device.

According to an example embodiment, a perception system associated with the robotic item unloader (e.g. the vision system 326 as described in FIG. 3) can receive inputs (e.g. point cloud data) from an array of IFM/3D cameras and RGB cameras (e.g. as described in FIG. 8). As illustrated, each RGB camera associated with an IFM camera can represent a single sensor unit of a sensor device. In this aspect, the sensor devices (802-808) can have one or more of such sensor units.

In accordance with some example embodiments described herein, a point cloud can be constructed based on the image information from the IFM camera and the RGB camera. As an example, the first sensor device 802 can provide a first point cloud data 810, the second sensor device can provide second point cloud data 812, the third sensor device 806 can provide a third point cloud data 814, and the fourth sensor device 808 can provide a fourth point cloud data 816, respectively. In an example embodiment, the first point cloud data 810 can include image information corresponding to a top-left portion of an environment in front of the robotic item unloader. Further, the second cloud data 812 can include image information corresponding to a top-right portion of the environment. Further, the third point cloud data 814 can include image information corresponding to a bottom-left portion of the environment and the fourth point cloud data 816 can include image information corresponding to a bottom-right portion of the environment that may be in front of the robotic item unloader.

Illustratively, information from the first point cloud data 810, the second point cloud data 812, the third point cloud data 814, and the fourth point cloud data 816 can be transformed to generate a merged point cloud 820. According to an example embodiment, the merged point cloud 820 may be a singular representation of an entire field of view in front of the robotic item unloader. In some examples, the merged point cloud 820 obtained after combining the top-left, the top-right, the bottom-left, and the bottom-right portions can represent an entire view of an item docking station that can be positioned in front of the robotic item unloader.

According to an example embodiment, a transformation of individual point cloud information from each sensor device to the merged point cloud 820 may include image stitching (i.e. stitching together respective image data corresponding to the individual point cloud data). Further, the image data (i.e. the point cloud data) from each of the sensor devices (802-808) can be processed so that each view appears to be originating from a common perspective point (e.g. a base frame 818) of a single sensor device of the robotic item unloader. According to example embodiment illustrated in FIG. 8, the transformation to the merged point cloud 820 can include stitching of image information from the first point cloud data 810, the second point cloud data 812, the third point cloud data 814, and the fourth point cloud data 816. In some example embodiments, the transformation may also include de-skewing images captured by the sensor devices (802-808) such that objects that originally appear in the images at an angle are converted to appear directly in front of (or parallel facing) the sensor devices (802-808) and/or the robotic item unloader. In this way, an output (i.e. 3D image information) from each of the sensor devices (802-808) can be adjusted so that they have a common point of reference. Once the image data has the same reference point (e.g., centered via the rectifying operations), image stitching can be performed to generate the merged point cloud 820. As illustrated, the merged point cloud 820 can be used by the machine learning engine 402 as an input to the CNN, details of which are already described earlier in reference to FIG. 4.

Figure 9:
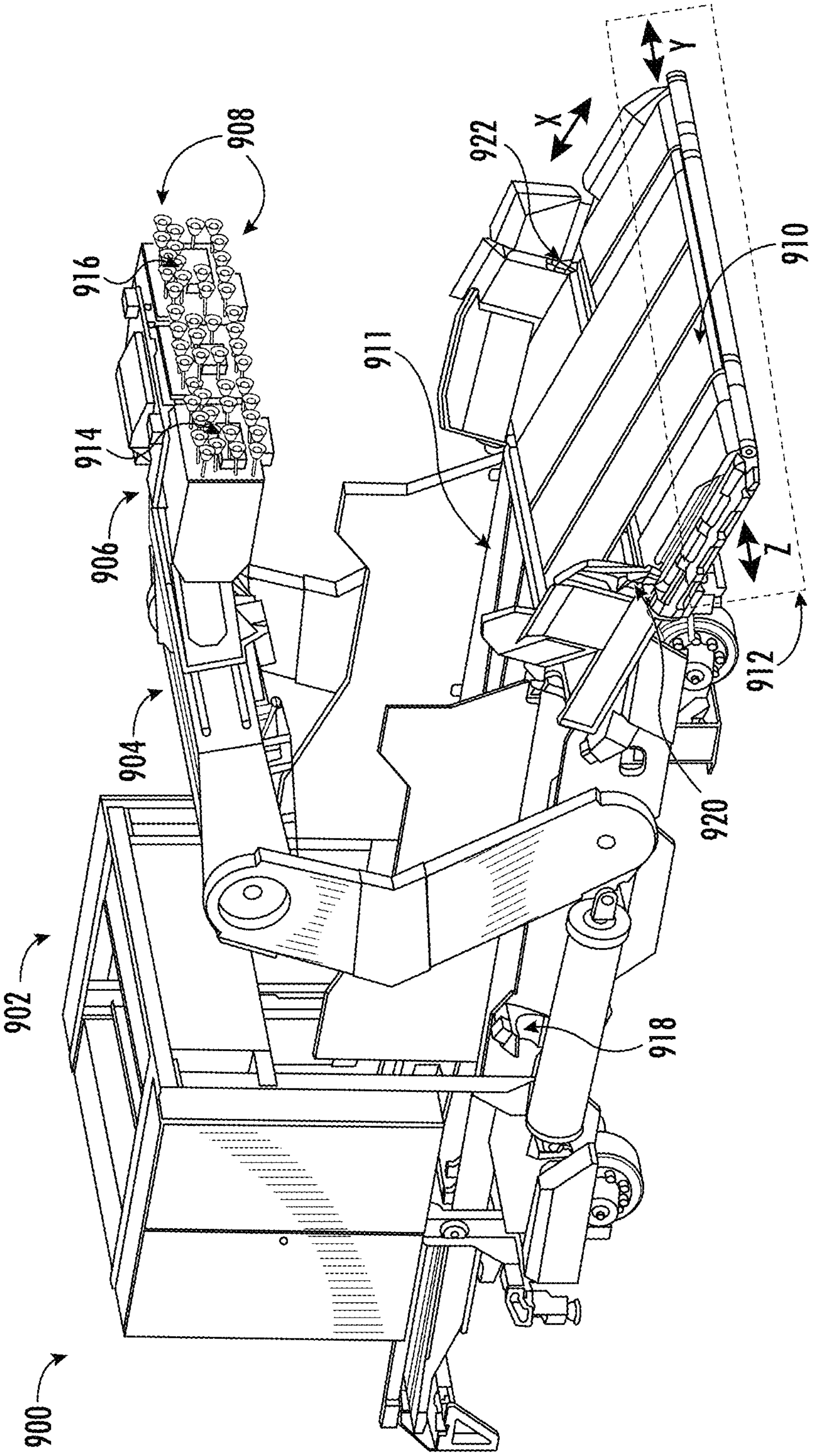
FIG. 9 illustrates a perspective view of a robotic item unloader, in accordance with an example embodiment described herein.

FIG. 9 illustrates a perspective view 900 of a robotic item unloader 902, in accordance with an example embodiment described herein. The robotic item unloader 902 can correspond to any of the robotic item handler 101 and/or robotic item unloader 301, as described earlier in reference to FIGS. 1 and 3 respectively. Illustratively, the robotic item unloader 902 can include a robotic arm 904 having an end effector 906. The end effector 906 can include an array of vacuum suction cups 908. Similar to as described earlier in reference to FIG. 5, each of the vacuum suction cups 908 can be configured to be actuated so as to move forward and/or backward from its initial position to grab an item based on vacuum suction force. Further, the robotic item unloader 902 also includes a platform 910. The platform 910 can be coupled to a conveyor 911. The platform 910 can be configured to be movably positioned so that a section 912 of the platform 910 can sweep below a portion of one or more items, thereby pulling the one or more items onto the conveyor 911 of the robotic item unloader 902. In this regard, the platform 910 can include one or more mechanical components and can be configured to move in any of directions X, Y, and/or Z depending on a requirement to pull the one or more items.

As illustrated, the robotic item unloader 902 can include multiple sensor devices (914, 916, 918, 920, 922 etc.) that can be located at various positions on the robotic item unloader 902. For instance, the sensor devices 916 and 914 may be located on the end effector 906 of the robotic arm 904. Further, the sensor devices 920 and 922 may be located on the platform 910 of the robotic item unloader 902. Each of these sensor devices (914-922) can be configured to capture a 3D image of an environment in its respective field of view. FIG. 9 illustrates an example of such operation with each of the sensor devices (914-922) performing a forward 3D scan for its respective field of views. Further, similar to as described earlier, the sensor devices (914-922) of the robotic item unloader 902 can be communicatively coupled to a processing device (e.g. the processing unit 202 of the computing device 110) that can obtain the 3D images captured by the sensor devices (914-918) and can further perform processing of these 3D images to construct the merged point cloud from the images. As described earlier, the merge point cloud can be representative of an entire field of view in front of the robotic item unloader 902 and can be used as an input to a CNN to construct a machine learning model. Further, the machine learning model can be used to select an operating mode of the robotic item unloader 902, described as earlier in reference to FIGS. 1-9.

Figure 10:
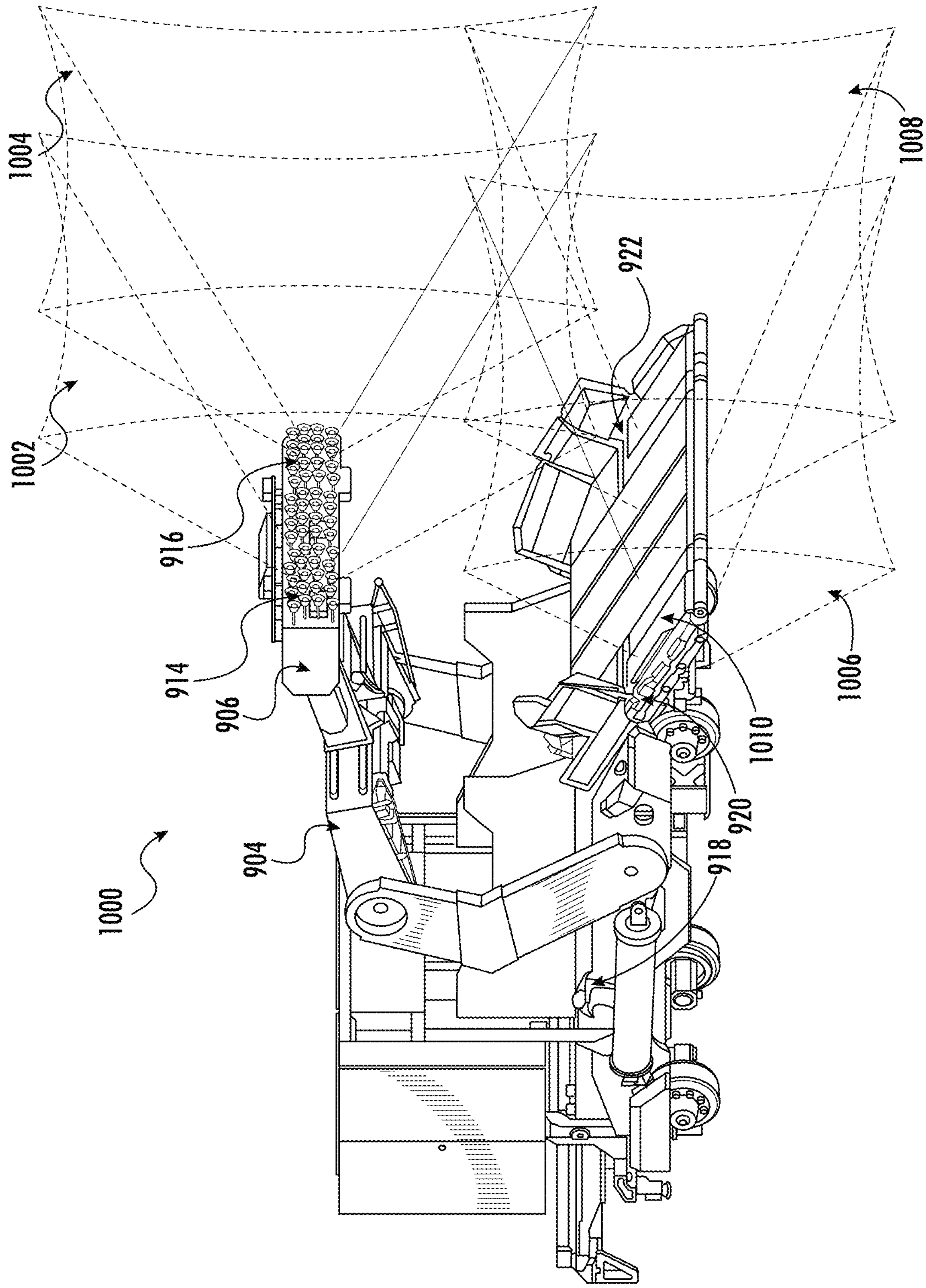
FIG. 10 illustrates a perspective view of a robotic item unloader with a plurality of sensor devices, in accordance with an example embodiment.

FIG. 10 illustrates a perspective view 1000 of the robotic item unloader 902 with the plurality of sensor devices (914-922), in accordance with an example embodiment. As illustrated, each of the sensor devices (914-922) can be configured to perform a forward 3D scan for a portion of environment which is in its respective field of views (1002, 1004, 1006, 1008, etc.). In this regard, each of the sensor devices (914-922) can capture a 3D image that can include a portion of an environment in its respective field of views (1002-1008) in front of the robotic item unloader 902. As an example, the sensor devices (914, 916) on the robotic arm 904 can capture 3D images, for instance, of top left and top right portions of an environment in front of the robotic item unloader 902. Similarly, the sensor devices (920, 922) on the platform 910 can capture images of bottom left and bottom right portions of the environment in front of the robotic item unloader 902. Further, as described earlier in references to FIGS. 1-9, point cloud data from each of these 3D images captured by the sensor devices (914-922) can be transformed to generate the merged point cloud representative of entire environment.

Figure 11:
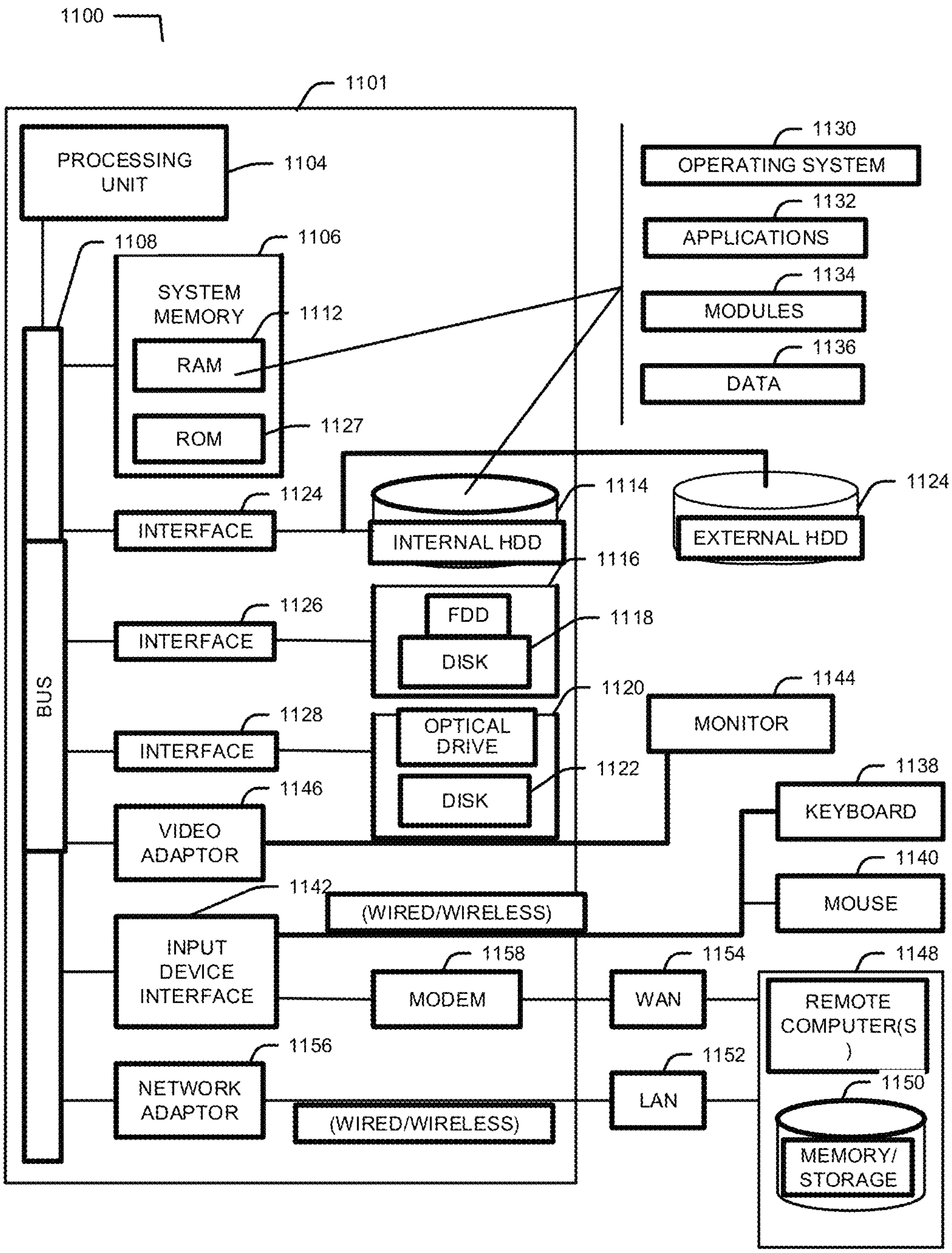
FIG. 11 illustrates a schematic view of an example computing device used along with a robotic item handler, in accordance with an example embodiment.

FIG. 11 illustrates a schematic view 1100 of an example of an electronic device 1101 (e.g. the computing device 110) that can be used along with the robotic item handler 101, in accordance with another example embodiment described herein. In some example embodiments, the electronic device 1101 can correspond to the computing device 110, as described in FIG. 1. In some example embodiments, one or more components of the electronic device 1101 can be used to perform one or more operations described in reference to FIGS. 6-8.

Referring now to FIG. 11, there is illustrated a block diagram of operable to execute the functions and operations performed in the described example embodiments. In some example embodiments, the electronic device 1101 can provide networking and communication capabilities between a wired or wireless communication network and a server and/or communication device. In order to provide additional context for various aspects thereof, FIG. 11 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices. In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term “modulated data signal” or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the electronic device 1101 can comprise a processing unit 1104, a system memory 1106 and a system bus 1108. The system bus 1108 can be configured to couple system components including, but not limited to, the system memory 1106 to the processing unit 1104. In some example embodiments, the processing unit 1104 can be any of various commercially available processors. To this end, in some examples, dual microprocessors and other multiprocessor architectures can also be employed as the processing unit 1104.

According to some example embodiments, the system bus 1108 can be any of several types of bus structure that can further interconnect to a memory bus (with or without a memory controller), a peripheral bus, and a local bus using any of a variety of commercially available bus architectures. In some examples, the system memory 1106 can comprise, read-only memory (ROM) 1127 and random-access memory (RAM) 1112. According to some example embodiments, a basic input/output system (BIOS) is stored in a non-volatile memory 1127 such as ROM, EPROM, EEPROM, which BIOS contains the basic routines that help to transfer information between elements within the electronic device 1101, such as during start-up. The RAM 1112 can also comprise a high-speed RAM such as static RAM for caching data.

According to some example embodiments, the computing device 1101 can further comprise an internal hard disk drive (HDD) 1114 (e.g., EIDE, SATA), which internal hard disk drive 1114 can also be configured for external use in a suitable chassis (not shown), a magnetic floppy disk drive (FDD) 1118, (e.g., to read from or write to a removable diskette 1116) and an optical disk drive 1120, (e.g., reading a CD-ROM disk or, to read from or write to other high capacity optical media such as the DVD). In some examples, the hard disk drive 1114, magnetic disk drive 1122, and optical disk drive 1120 can be connected to the system bus 1108 by a hard disk drive interface 1124, a magnetic disk drive interface 1126 and an optical drive interface 1128, respectively. According to some example embodiments, the interface 1124 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the electronic device 1101 the drives and media accommodate the storage of any data in a suitable digital format. Although the description of computer-readable media above refers to a HDD, a removable magnetic diskette, and a removable optical media such as a CD or DVD, it can be appreciated by those skilled in the art that other types of media which are readable by an electronic device 1101, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 1112, including an operating system 1130, one or more application programs 1132, other program modules 1134 and program data 1136. To this end, in some examples, all or portions of the operating system, applications, modules, and/or data can also be cached in the RAM 1112. It is to be appreciated that the various embodiments can be implemented with various commercially available operating systems or combinations of operating systems.

According to some example embodiments, a user can enter commands and information into the computing device 1101 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. In some examples, these and other input devices are often connected to the processing unit 1104 through an input device interface 1142 that is coupled to the system bus 1108, but can be connected by other interfaces, such as a parallel port, an IEEE 13114 serial port, a game port, a USB port, an IR interface, etc.

According to some example embodiments, a monitor 1144 or other type of display device can also be connected to the system bus 1108 through an interface, such as a video adapter 1146. In addition to the monitor 1144, the computing device 1101 can also comprise other peripheral output devices (not shown), such as speakers, printers, etc.

According to some example embodiments, the computing device 1101 can operate in a networked environment using logical connections by wired and/or wireless communications to one or more remote computers, such as a remote computer(s) 1148. In some examples, the remote computer (s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. According to some example embodiments, the logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

In some examples, when used in a LAN networking environment, the computing device 1101 can be connected to the LAN 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

In alternate examples, when used in a WAN networking environment, the computing device 1101 can include a modem 1158, or can be connected to a communications server on the WAN 1154 or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

According to some example embodiments, the computing device 1101 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE1102.11 (a, b, g, n, etc.) to provide secure, reliable, fast wireless connectivity. Further, in accordance with some example embodiments described herein, a Wi-Fi network can be used to connect computers or the plurality of electronic devices 102-10N to each other, to the Internet, and to wired networks (which use IEEE1102.3 or Ethernet). Wi-Fi networks operate in the unlicensed 2.4 and 5 GHz radio bands, at an 11 Mbps (1102.11b) or 54 Mbps (1102.11a) data rate, for example, or with products that contain both bands (dual band), so the networks can provide real-world performance similar to the basic “9BaseT” wired Ethernet networks used in many offices.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as “thereafter,” “then,” “next,” etc. are not intended to limit the order of the steps; these words are simply used to guide the reader through the description of the methods. Further, any reference to claim elements in the singular, for example, using the articles “a,” “an” or “the” is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, some steps or methods can be performed by circuitry that is specific to a given function.

In one or more exemplary aspects, the functions described can be implemented in hardware, software, firmware, or any combination thereof. If implemented in software, the functions can be stored as one or more instructions or code on a non-transitory computer-readable medium or non-transitory processor-readable medium. The steps of a method or algorithm disclosed herein can be embodied in a processor-executable software module (or processor-executable instructions) which can reside on a non-transitory computer-readable or processor-readable storage medium. Non-transitory computer-readable or processor-readable storage media can be any storage media that can be accessed by a computer or a processor. By way of example but not limitation, such non-transitory computer-readable or processor-readable media can include RAM, ROM, EEPROM, FLASH memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm can reside as one or any combination or set of codes and/or instructions on a non-transitory processor-readable medium and/or computer-readable medium, which can be incorporated into a computer program product.

While various embodiments in accordance with the principles disclosed herein have been shown and described above, modifications thereof can be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above can relate to specific embodiments but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the invention(s) set out in any claims that can issue from this disclosure. For instance, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions can be set forth according to the limitations of the multiple claims issuing from this disclosure, and such claims accordingly define the invention(s), and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate can be combined or integrated with other systems, modules, techniques, or methods without departing from the scope of the present disclosure. Other items shown or discussed as directly coupled or communicating with each other can be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. For example, the various elements or components can be combined or integrated in another system or certain features can be omitted or not implemented. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

As will be appreciated, any such computer program instructions and/or other type of code can be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry. In some embodiments, one or more external systems (such as a remote cloud computing and/or data storage system) can also be leveraged to provide at least some of the functionality discussed herein.

As described above and as will be appreciated based on this disclosure, embodiments of the present invention can be configured as methods, personal computers, servers, mobile devices, backend network devices, and the like. Accordingly, embodiments can comprise various means including entirely of hardware or any combination of software and hardware. Furthermore, embodiments can take the form of a computer program product on at least one non-transitory computer-readable storage medium having computer-readable program instructions (e.g., computer software) embodied in the storage medium. Any suitable computer-readable storage medium can be utilized including non-transitory hard disks, CD-ROMs, flash memory, optical storage devices, or magnetic storage devices.

What is claimed is:

1. A method for controlling a robotic item handler, the method comprising:

constructing a machine learning model based on a-combined point cloud data as an input to a convolutional neural network;

outputting, via the machine learning model, a decision classification indicative of a first probability associated with a first operating mode and a second probability associated with a second operating mode;

selecting one of the first operating mode and the second operating mode of the robotic item handler based on the decision classification outputted by the machine learning model;

operating the robotic item handler according to the selection of the one of the first operating mode and the second operating mode;

adjusting a first weight associated with the decision classification and a second weight associated with a pre-defined heuristic associated with past operations of the robotic item handler, based on a performance associated with the output of the machine learning model over a period of time, wherein during initial stages of learning by the machine learning model, the first weight is less than the second weight and after a substantial period of time has been utilized to train the machine learning model, the second weight is less than the first weight; and controlling the robotic item handler based on an evaluation of the selection using the pre-defined heuristic.

2. The method of claim 1, comprising:

obtaining first point cloud data related to a first three-dimensional image captured by a first sensor device of the robotic item handler;

obtaining second point cloud data related to a second three-dimensional image captured by a second sensor device of the robotic item handler; and transforming the first point cloud data and the second point cloud data to generate the combined point cloud data.

3. The method of claim 2, further comprising:

operating the robotic item handler according to the second operating mode upon determining that a height of an item is below a pre-defined height.

4. The method of claim 1, wherein:

(i) the first operating mode is selected in response to the first probability being higher than the second probability, and (ii) the second operating mode is selected in response to the second probability being higher than the first probability.

5. The method of claim 1, wherein:

(i) the first operating mode is associated with picking an item by grasping the item using an end effector of a robotic arm of the robotic item handler, and (ii) the second operating mode is associated with sweeping a pile of items from an item docking station with a platform of the robotic item handler.

6. The method of claim 1, wherein the pre-defined heuristic defines coordinates of an item in a three-dimensional space.

7. The method of claim 1, comprising:

obtaining first point cloud data related to a first three-dimensional image captured by a first sensor device of the robotic item handler, wherein the first sensor device is a part of a vision system configured to provide at least one of a depth perception, an edge recognition and a 3D image of at least a wall of items in a three-dimensional space.

8. The method of claim 7, wherein the vision system is further configured to recognize at least one of edges, shapes, and distances of items in front of the robotic item handler.

9. The method of claim 1, wherein the combined point cloud data comprises a first portion representing a Red-Green-Blue (RGB) image data and a second portion representing a depth image data.

10. The method of claim 9, further comprising:

processing the RGB image data through a first set of layers of the convolutional neural network and processing the depth image data through a second set of layers of the convolutional neural network.

11. A robotic item handler comprising:

one or more processors configured to:

construct a machine learning model by using a combined point cloud data as an input to a convolutional neural network;

output, by the machine learning model, a decision classification indicative of a first probability associated with a first operating mode and a second probability associated with a second operating mode;

select one of the first operating mode and the second operating mode of the robotic item handler based on the decision classification outputted by the machine learning model;

control the robotic item handler by: operating a robotic arm of the robotic item handler according to the selection of the one of the first operating mode and the second operating mode;

adjust a first weight associated with the decision classification and a second weight associated with a pre-defined heuristic associated with past operations of the robotic item handler, based on a performance associated with the output of the machine learning model over a period of time, wherein during initial stages of learning by the machine learning model, the first weight is less than the second weight and after a substantial period of time utilized to train the machine learning model, the second weight is less than the first weight; and control the robotic item handler based on an evaluation of the selection using the pre-defined heuristic.

12. The robotic item handler of claim 11, further comprising:

a vision system comprising:

a first sensor device positioned at a first location on the robotic item handler; and a second sensor device positioned at a second location on the robotic item handler;

a robotic arm comprising an end effector configured to operate in the first operating mode; and a platform comprising a conveyor configured to operate in the second operating mode.

13. The robotic item handler of claim 12, wherein the vision system is configured to:

provide at least one of a depth perception, an edge recognition and a 3D image of at least a wall of items in a three-dimensional space; and recognize at least one of edges, shapes, and distance of items in front of the robotic item handler.

14. The robotic item handler of claim 11, wherein the one or more processors are configured to:

obtain first point cloud data related to a first three-dimensional image captured by a first sensor device;

obtain second point cloud data related to a second three-dimensional image captured by a second sensor device; and transform the first point cloud data and the second point cloud data to generate the combined point cloud data.

15. The robotic item handler of claim 14, wherein:

(i) the first operating mode is selected in response to the first probability being higher than the second probability, and (ii) the second operating mode is selected in response to the second probability being higher than the first probability.

16. The robotic item handler of claim 15, wherein:

(i) the first operating mode is associated with picking an item by grasping the item using an end effector of a robotic arm of the robotic item handler, and (ii) the second operating mode is associated with sweeping a pile of items from an item docking station with a platform of the robotic item handler.

17. The robotic item handler of claim 16, wherein the one or more processors are further configured to:

operate the robotic item handler according to the second operating mode upon determining that a height of the item is below a pre-defined height.

18. The robotic item handler of claim 17, wherein the pre-defined heuristic defines coordinates of the item in a three-dimensional space.

19. A non-transitory computer readable medium that stores thereon computer-executable instructions that in response to execution by one or more processors, perform operations comprising:

constructing a machine learning model by using a combined point cloud data as an input to a convolutional neural network;

outputting, by the machine learning model, a decision classification indicative of a first probability associated with a first operating mode of a robotic item handler and a second probability associated with a second operating mode;

generating a first command to operate the robotic item handler based on the decision classification;

adjusting a first weight associated with the decision classification and a second weight associated with a pre-defined heuristic associated with past operations of the robotic item handler handler, based on a performance associated with the output of the machine learning model over a period of time, wherein during initial stages of learning by the machine learning model, the first weight is less than the second weight and after a substantial period of time utilized to train the machine learning model, the second weight is less than the first weight; and generating a second command to operate the robotic item handler based on an evaluation of a selection of one of the first operating mode and the second operating mode using the pre-defined heuristic.

20. The non-transitory computer readable medium of claim 19, wherein the first command is to:

(i) Operate the robotic item handler according to the first operating mode in response to the first probability being higher than the second probability; and (ii) operate the robotic item handler according to the second operating mode in response to the second probability being higher than the first probability.

* * * * *